United States Patent
Silva

(10) Patent No.: US 12,209,920 B1
(45) Date of Patent: Jan. 28, 2025

(54) SYSTEMS AND APPARATUSES FOR TRANSMISSION OVER A COMMON DIFFERENTIAL WIRE PAIR

(71) Applicant: Martha Silva, Fresno, CA (US)

(72) Inventor: John F. Silva, Fresno, CA (US)

(73) Assignee: Electsol-DSP LLC, Fresno, CA (US)

( * ) Notice: Subject to any disclaimer, the term of this patent is extended or adjusted under 35 U.S.C. 154(b) by 891 days.

(21) Appl. No.: 17/213,020

(22) Filed: Mar. 25, 2021

Related U.S. Application Data

(60) Provisional application No. 62/994,773, filed on Mar. 25, 2020.

(51) Int. Cl.
  *G01K 7/00* (2006.01)
  *G01K 1/024* (2021.01)
  *G01K 7/24* (2006.01)
  *G01K 15/00* (2006.01)

(52) U.S. Cl.
  CPC ............. *G01K 7/24* (2013.01); *G01K 1/024* (2013.01); *G01K 15/007* (2013.01)

(58) Field of Classification Search
  CPC .......... G01P 21/00; G01P 15/09; G01L 25/00; G01L 1/16; G01H 11/08; H10N 30/30; G01K 7/24; G01K 1/024
  See application file for complete search history.

(56) References Cited

U.S. PATENT DOCUMENTS

| | | | | |
|---|---|---|---|---|
| 2,895,671 A | * | 7/1959 | Andrew | G06F 15/78 711/110 |
| 3,693,163 A | * | 9/1972 | Johnson | G05B 15/02 700/9 |
| 3,793,624 A | * | 2/1974 | Vaskunas | G07F 7/08 379/91.01 |
| 4,106,009 A | * | 8/1978 | Dick | H01J 11/14 313/518 |
| 4,322,728 A | * | 3/1982 | Ginn | G08C 19/04 340/870.11 |
| 4,532,507 A | * | 7/1985 | Edson | G08B 25/008 340/541 |

(Continued)

FOREIGN PATENT DOCUMENTS

| | | | | |
|---|---|---|---|---|
| CA | 2825642 A1 | * | 2/2014 | ............. G01H 11/08 |
| CN | 101252393 B | * | 5/2012 | |
| CN | 105159380 A | * | 12/2015 | |

(Continued)

OTHER PUBLICATIONS

17213020_2024-08-20_CN_105159380_A_H.pdf2015-12-16.*

(Continued)

*Primary Examiner* — Gail Kaplan Verbitsky

(74) *Attorney, Agent, or Firm* — Marcus N. DiBuduo; John R. Aaron

(57) ABSTRACT

A system for transmitting information from multiple remote devices over a common differential pair includes an interface and at least two transducers. The transducer is coupled to the remote device and, in response to a strobe signal from the interface, utilizes a latching thyristor and an LCR circuit to generate a pair of tuned, cycle-limited current pulses through the differential pair. The interface includes a strobe stage and an acquisition stage, and isolates the transducers from a microcontroller and power supply.

11 Claims, 24 Drawing Sheets

(56) References Cited

U.S. PATENT DOCUMENTS

| | | | | |
|---|---|---|---|---|
| 4,796,025 A | * | 1/1989 | Farley | H04Q 9/14 |
| | | | | 340/3.4 |
| 2012/0221276 A1 | * | 8/2012 | Schmidt | G01C 21/165 |
| | | | | 702/141 |

FOREIGN PATENT DOCUMENTS

| | | | | | |
|---|---|---|---|---|---|
| GB | 2104696 A | * | 3/1983 | | G07C 9/00142 |
| JP | S6113292 A | * | 1/1986 | | G01H 11/08 |
| JP | H10111765 A | * | 4/1998 | | |

OTHER PUBLICATIONS

17213020_2024-08-20_JP_H10111765_A_H.pdf, Apr. 28, 1998.*
17213020_2024-08-20_JP_S6113292_A_H.pdf, Jan. 21, 1986.*
17213020_2024-08-20_CA_2825642_A1_H.pdf,Feb. 28, 2014.*
17213020_2024-08-20_CN_101252393_B_H.pdf,May 9, 2012.*
"Pulse Position Modulation and Differential PPM", Giorgos Lazaridis, believed to be first published on Jun. 26, 2011, retrieved Oct. 4, 2021 from https://web.archive.org/web/20110626123940/http://www.pcbheaven.com/wikipages/Pulse_Position_Modulation/.

* cited by examiner

SYSTEMS AND APPARATUSES FOR TRANSMISSION OVER A COMMON DIFFERENTIAL WIRE PAIR

CROSS-REFERENCE TO RELATED APPLICATIONS

The present application claims priority to, and the benefit of, U.S. Provisional Patent Application No. 62/994,773, filed Mar. 25, 2020, which is hereby incorporated by reference in its entirety.

FIELD OF THE INVENTION

The present invention generally concerns the transmission of electronic data over long distances. More particularly, some embodiments of the present invention concern systems, methods, and apparatuses for transmitting information from one or more devices over a long distance along a common cable.

BACKGROUND OF THE INVENTION

In many sensor-based electronic systems, analog-to-digital converters ("ADC") are often used in order to convert an analog signal from a sensor into a digitized, computer-readable signal that is then transmitted to a distant controller over a digital bus. In many conventional remote temperature sensing systems, a device may comprise an analog thermistor (temperature sensor), analog integrated circuit, and an ADC. An analog signal from the thermistor, which is proportional to the temperature of the thermistor, may be received by the ADC that produces a corresponding digital signal.

In systems involving multiple devices, the digital bus can be a Controller Area Network ("CAN") bus where each device transmits a digital signal carrying data corresponding to its respective analog signal on an asynchronous bus. While a CAN bus can handle traffic of a moderate number of devices, it is not without limit. Information encoded in signals from adjacent devices (e.g., physically, electrically, or logically adjacent), and those within the same loop, can be reduced, in terms of amplitude, or completely lost. Similarly, buses utilizing the Highway Addressable Remote Transducer ("HART") protocol and legacy 4-20 mA current loop analog systems, in which digital signals are overlaid on a 4-20 mA current loop, can be susceptible to loop resistance, cable drop, and power supply tolerance and variation issues-issues which can be significant over long runs. Moreover, service, repair, or replacement of conventional system devices is typically impractical, or even impossible (e.g., due to installation in unserviceable locations). Even in conventional implementations, such as those involving a CAN bus or HART bus, there is insufficient fault tolerance and the system can often be cumbersome to install, configure, and scale. Furthermore, specialized cable is required, which is limited in terms of its operability and/or functionality over long distances.

Alternative systems for remote temperature sensing may involve transmission of analog signals on a common line, where the output of the analog thermistor is not digitized. The analog signal from the thermistor may be scaled and/or modulated for propagation on a multi-node (or multi-device) analog bus, typically using time domain multiplexing. The controller may receive and decode the multiple analog signals. There is also insufficient fault tolerance of these conventional implementations, and moreover, is not suitable for transmission over large distances due to cable loss.

It is, therefore, desirable for a system which can accommodate a large number of analog sensors with a high level of fault tolerance and which can maintain information integrity over long distances while minimizing device component counts, costs and/or complexities, relative to the prior art.

BRIEF SUMMARY OF THE INVENTION

In some aspects of the present invention, provided are systems, methods, and apparatuses for transmitting information from multiple devices over a common cable. In general, systems may include a cable, a microcontroller unit (MCU), an isolated power supply, an interface, and one or more transducers each operatively engaged with a sensor.

In preferred embodiments, the sensor may comprise an analog sensor such as a thermistor. In some other embodiments, the sensor may comprise an integrated circuit having an output that varies in resistance or voltage, or acts as a current source. It is to be appreciated, however, that other sensor-transducer interfaces are contemplated in accordance with some embodiments of the present invention. For example, and without limitation, a transducer in accordance with some embodiments of the present invention can receive digital data from a sensor in accordance with some embodiments of the present invention.

In an exemplary embodiment, a transducer may receive an analog signal from a sensor and produce, therefrom, a pair of analog signals, where the spacing (i.e., the time interval between the pair of signals) is proportional to the analog signal received from the sensor. In preferred embodiments, each of the pair of signals may be a current pulse. This pair of signals may then be transmitted on a differential wire pair (sometimes referred to hereinafter more generally as "differential pair") of the common cable to an interface where the time interval may be, at least partially, derived, scaled, and provided by and/or to an MCU. In some embodiments, the cable may be an unshielded cable. Within the MCU, the time interval may be analyzed and converted to a digital signal corresponding to the original analog signal received by the transducer. It is to be appreciated that each transducer may generate a pair of signals (in some embodiments, a pair of current pulses) on the differential pair, each transducer producing its corresponding pair of signals at a different time from other transducers.

In systems having multiple sensors, each transducer may be pre-configured or programmed to report its converted value at a particular, and in some cases predetermined, time (i.e., the pair of signals may be transmitted on the differential pair at certain times relative to an event). In some embodiments, the differential pair may be associated with one or more strobe lines. A strobe signal can be provided on the strobe line by an interface to each transducer (or subgroup of transducers) associated with the differential pair and that strobe line. The strobe signal may identify to each transducer that it is to begin transmitting its respective pairs of analog signals. Each transducer associated with a differential pair may be predetermined to start transmitting at a certain and unique time relative to the strobe signal. It is to be appreciated that a single differential pair may be associated with an unlimited number of transducers.

The time intervals between each pair of signals can be scaled over the strobed time domain to avoid interference. For example, to accommodate multiple sensors, a transducer may produce a pair of signals with a shortened time interval therebetween (relative to other transducers associated with the differential pair having the same analog sensor input). It is to be appreciated that this may cause the resulting information received by the MCU to be scaled relative to the original analog signal. To compensate for such scaling, at the MCU, the output signal from a transducer in a multiple-sensor system may scaled to obtain normalized values amongst all sensors on the differential pair.

According to some embodiments of the present invention, a system for monitoring at least two analog sensors may comprise: a multi-conductor cable which may comprise a differential power line and a strobe line with the differential power line having a positive line and a negative line; a first transducer coupled with the cable and a first sensor; a second transducer coupled with the cable and a second sensor; and an interface coupled with the cable, an isolated power supply, and a microcontroller, where the interface which may comprise: (i) a strobe stage to provide a strobe signal on the strobe line to cause the first transducer to provide a report signal corresponding to the first sensor and the second transducer to provide a report signal corresponding to the second sensor; and (ii) an acquisition stage to receive the first transducer report signal and the second transducer report signal on the differential power line.

In further embodiments, the first transducer report signal may comprise a pair of cycle limited current pulses through the differential power line.

In further embodiments, the first transducer may cause the first of the pair of current pulses of the first transducer report signal to commence at a first time relative to the strobe signal.

In further embodiments, the first transducer may cause the second of the pair of current pulses of the first transducer report signal to commence at a second time relative to the strobe signal, wherein a difference between the first time and the second time may correspond to a characteristic of the first sensor.

In further embodiments, the second transducer report signal may comprise a pair of current pulses through the differential power line, the second transducer may cause the first of the pair of current pulses of the second transducer report signal to commence at a third time relative to the strobe signal, and the second transducer may cause the second of the pair of current pulses of the second transducer report signal to commence at a fourth time relative to the strobe signal, wherein a difference between the third time and the fourth time may correspond to a characteristic of the second sensor.

In further embodiments, each transducer may comprise a first and a second latching bistable switch for providing conduction between the positive and the negative lines of the differential power line for a limited duration.

In further embodiments, each bistable switch may comprise a thyristor.

In further embodiments, each transducer may comprise (i) a transducer identifier trigger coupled with the first switch and (ii) a sensor value trigger coupled with the second switch.

In further embodiments, the sensor value trigger of the first transducer may be further coupled with the first sensor and the sensor value trigger of the second transducer may be further coupled with the second sensor.

According to some embodiments of the present invention, a system for monitoring an analog sensor may comprise: a transducer which may comprise a transducer identifier trigger, a sensor value trigger coupled with the sensor, a first thyristor coupled with the transducer identifier trigger, and a second thyristor coupled with the sensor value trigger; and an interface coupled with an isolated power supply and with a microcontroller, where the interface may comprise a strobe stage and an acquisition stage; wherein the strobe stage may comprise a driver circuit, where the driver circuit may comprise an opto-isolator having (i) a light emitter coupled with the microcontroller and (ii) a light sensor coupled with a gate of a field-effect transistor, where the field-effect transistor may further have a drain coupled with the transducer providing a strobe signal thereto; and wherein the acquisition stage may comprise an opto-isolator having (i) a light sensor coupled with the microcontroller and (ii) a light emitter coupled between a positive line of the isolated power supply and a first side of an inductor, where the inductor may have a second side coupled to the transducer receiving a report signal therefrom; and wherein the transducer may be configured to, in response to the strobe signal, provide the report signal by providing conduction between the second side of the inductor and a negative line of the isolated power supply for a limited duration.

In further embodiments, the report signal may comprise a first and a second cycle limited current pulse, wherein the transducer may be preconfigured to provide the first current pulse at a first time from the strobe signal, and wherein the transducer may provide the second current pulse at a second time corresponding to a characteristic of the sensor.

According to some embodiments of the present invention, a transducer may be coupled with an analog sensor, a positive and a negative differential line, and a strobe line, where the transducer may comprise: a transducer identifier circuit configured to conduct a first electrical impulse between the positive and the negative differential lines for a limited duration and in response to a signal on the strobe line, where the transducer identifier circuit may comprise a transducer identifier trigger circuit, a transducer identifier coupling circuit, and a transducer identifier conduction circuit, where the transducer identifier conduction circuit may have a thyristor with a gate receiving an output signal of the transducer identifier trigger circuit; and a sensor value circuit which may be configured to selectively conduct a second electrical impulse between the positive and the negative differential lines for a limited duration and in response to a signal from the analog sensor, where the sensor value circuit may comprise a sensor value trigger circuit, a sensor value coupling circuit, and a sensor value conduction circuit, where the sensor value conduction circuit may have a thyristor with a gate receiving an output signal of the sensor value trigger circuit; wherein the transducer identifier circuit may be preconfigured to conduct the first electrical impulse at a first time relative to the signal on the strobe line, and wherein the sensor value circuit may conduct the second electrical impulse at a second time (i) relative to the first electrical impulse and (ii) corresponding to a magnitude of the analog sensor signal.

In further embodiments, the transducer identifier coupling circuit and the sensor value coupling circuit may each comprise a resistor and a capacitor in parallel.

In further embodiments, the transducer identifier conduction circuit and the transducer identifier coupling circuit may be in series between the positive and the negative differential lines, and the sensor value conduction circuit and the sensor value coupling circuit may be in series between the positive and the negative differential lines.

In further embodiments, the transducer identifier trigger circuit may comprise a monostable timer, where the monostable timer may have an output coupled to the gate of the transducer identifier conduction circuit and a supply coupled to the strobe line.

In further embodiments, the monostable timer may have a predetermined time constant.

In further embodiments, the sensor value trigger circuit may comprise a monostable timer, where the monostable timer may have an output coupled to the gate of the sensor value conduction circuit and a supply coupled to the strobe line.

In further embodiments, the monostable timer may be further coupled to the analog sensor and the transducer identifier coupling circuit.

In further embodiments, the analog sensor may comprise a thermistor.

In further embodiments, the monostable timer may have a time constant corresponding to a temperature of the thermistor.

DETAILED DESCRIPTION OF INVENTION

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention, including any length, angles, or other measurements provided. Rather the invention, as defined by the claims, may cover alternatives, modifications, and/or equivalents of the exemplary embodiments.

In some embodiments, the present invention may be generally described as a communications topology comprising one or more sensors, one or more transducers (or more generally, devices or modules), an interface, a controller, and a multi-conductor cable comprising at least one strobe line and at least one differential pair. The multi-conductor cable may allow for hundreds of devices to be connected to a single multi-conductor cable which may extend thousands of feet. For example, in a multiple-sensor temperature measurement system, a multi-conductor cable may have a plurality of temperature sensors coupled with transducers connected along the length thereof for reporting temperature at the respective physical locations of each sensor. A transducer may receive the analog signal from the sensor, and translate the signal into a pair of signals (which, in some implementations, is a pair of analog current pulses) which may be transmitted to a microcontroller unit ("MCU") on a differential pair, wherein a first signal may precede a second signal by a certain interval of time (the time interval being analogous to the temperature sensed). Once received by the MCU, the time interval between each pair of signals may be computed and the information may converted into digital form to produce a digitized temperature value analogous to the analog signal from the temperature sensor.

Signaling Protocol

In some embodiments of the present invention, one or more transducers may be strobe-enabled—i.e., they may be triggered to begin operation at specific predetermined times relative to a strobe signal. Each transducer may enable, on a differential pair, a first pulse of current followed by a second pulse of current. In preferred embodiments, each current pulse may be tuned and cycle limited. The first pulse may commence at a predetermined time relative to the strobe signal. The second pulse may commence at a time, relative to the first pulse, corresponding to an analog signal received by the transducer (for example, and without limitation, from a temperature sensor).

Figure 1:
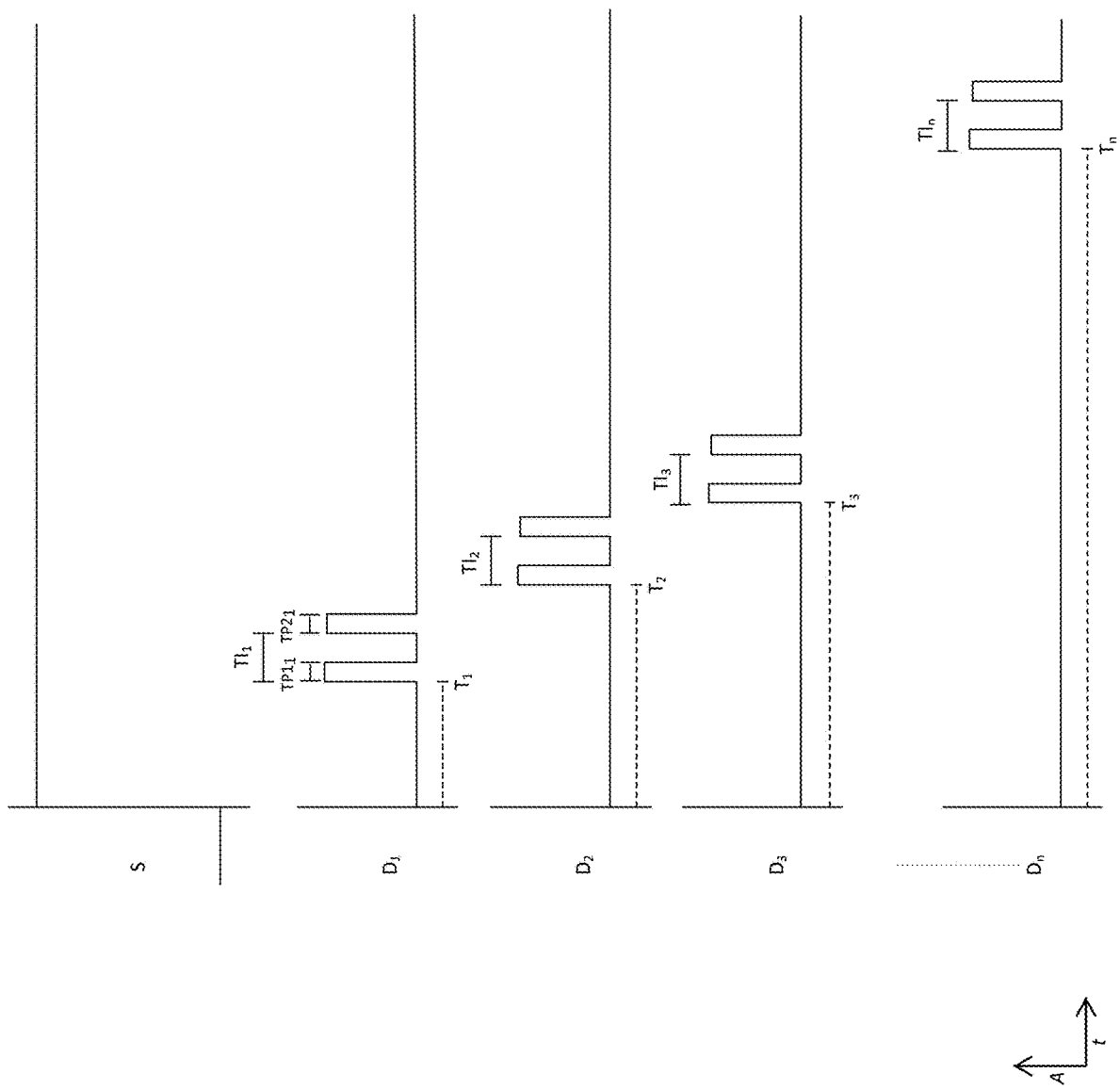
FIG. 1 is a diagram illustrating an exemplary simplified signaling protocol in accordance with some embodiments of the present invention.

FIG. 1 illustrates a simplified protocol for transmitting information from multiple sensors along a common differential pair in accordance with some embodiments of the present invention. It is to be appreciated that the signaling protocol in FIG. 1 is provided for convenience in understanding the timing aspects of the invention, and the waveforms illustrated are not intended to reflect the actual waveforms (in terms of amplitude, polarity, frequency, or shape) of the signals.

As shown, strobe signal S and current pulses from transducers $D_1$, $D_2$, and $D_3$ are depicted by signal graphs, where the amplitude A of the signal is represented on the vertical axes and time/is represented on the horizontal axes. As the strobe line is activated (i.e., transitions from one state to another, or in some embodiments not shown, is pulsed), each transducer coupled thereto may be enabled at a given time: $D_1$ may be enabled at time $T_1$; $D_2$ may be enabled at time $T_2$; and $D_3$ may be enabled at time $T_3$. In preferred embodiments, the enable time may be measured in relation to the leading edge of the strobe signal, and the leading edge of first of a signal pair of each of the devices. When each transducer is enabled, a first of a signal pair (in some embodiments, and without limitation, a current pulse) may be generated, i.e., at $T_1$, $T_2$, $T_3$. After a certain amount of time, a second of the signal pair may be generated, i.e., at $TI_1$, $TI_2$, $TI_3$. The time interval between the first and the second pulse, in preferred embodiments, may be between a leading edge of each the first and the second of a signal pair. The time interval may correspond with, or may be proportional to, an input analog signal received by each transducer and this information may be propagated to a data controller where it can be parsed, translated, and/or transformed by determining the difference between $TI_1$ and $T_1$, $TI_2$ and $T_2$, and $TI_3$ and $T_3$. After all devices associated with a particular strobe signal have generated their corresponding signal pairs, in some embodiments of the present invention having multiple strobe lines (as shown, for example, in FIG. 8), a second strobe signal may be generated-thus enabling all devices associated with the second strobe signal to generate corresponding signal pairs, each device being enabled, respectively, at a given time.

It is to be appreciated that a single strobe line may accommodate a plurality of transducers, each reporting at different times with unambiguous signals. This is further represented in FIG. 1 by a device $D_n$ with a first of a signal pair at a time $T_n$ and a time interval of $TI_n$ between the first and the second of a signal pair, where "n" is an integer representing the number of a transducers in a group of transducers coupled to a common strobe. Also, it is to be understood that FIG. 1 is not drawn to scale and the relative timing and amplitude of the each of the signal pairs, as well as the relative time intervals therebetween, may be different in a practical application. As discussed above, enabling of transducers relative to the strobe signal (e.g., $T_1$, $T_2$, $T_3$) may be scaled or non-linear. In preferred embodiments, the timing may increase logarithmically (e.g., $T_1$, $T_2$, $T_3$, through $T_n$ may increase logarithmically over the time domain).

As illustrated in FIG. 1, the first of the signal pair corresponding to device $D_1$ can have a pulse width of $TP1_1$ and the second of the signal pair can have a pulse width of $TP2_1$. In some embodiments, the width of each of the first and the second of a signal pair may be fixed. In some other embodiments, the widths may be adjustable and may be selected to provide additional information about the particular analog sensor and/or contain information to validate the analog data corresponding to the time interval between the first and the second of the signal pairs. For example, and without limitation, pulse width $TP1_1$ may be selected to provide information about device $D_1$ such as the type, range, or identification of the device and pulse width $TP2_1$ may be selected to include error correction or detection information regarding time interval $TI_1$. However, it is to be appreciated that the pulse widths can provide any information useful to the system or signaling protocol.

Exemplary Waveforms

To ease in understanding some implementations of signaling protocol in accordance with embodiments of the present invention, representative waveform snapshots are provided and explained in FIGS. 2-5. In each of FIGS. 2-5, the "A" series trace (i.e., A1, A2, A3, and A4, respectively) represents the strobe signal, the "B" series trace (i.e., B1, B2, B3, and B4, respectively) represents the current in the differential pair which may be considered "pre-conditioned" (and may be provided to an opto-isolator, as discussed below), the "C" series trace (i.e., C1, C2, C3, and C4, respectively) represents the signal at an output of the opto-isolator, and the "D" series trace (i.e., D1, D2, D3, and D4, respectively) represents the conditioned signal.

Figure 2:
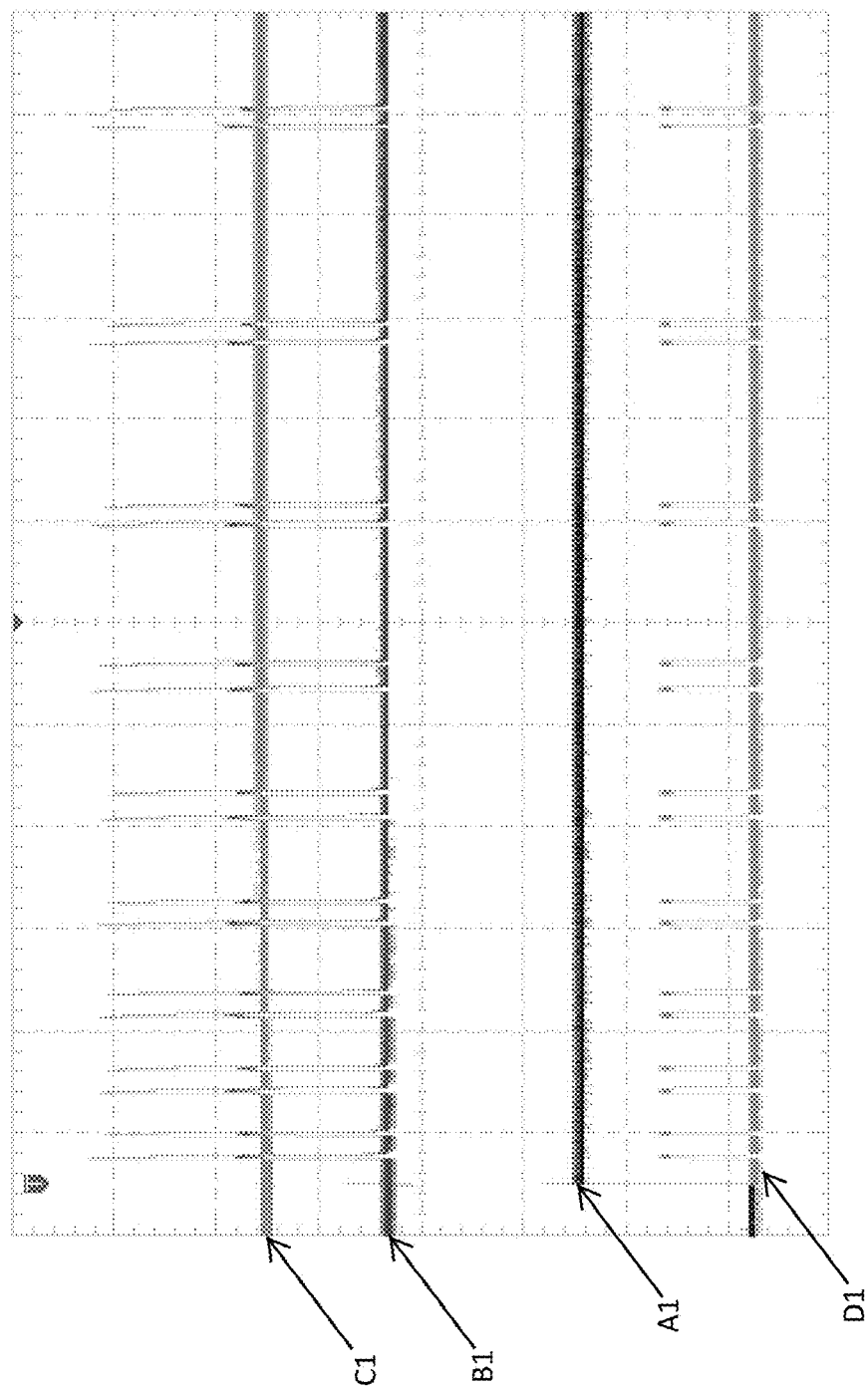
FIGS. 2-5 are snapshots of exemplary waveforms according to some implementations of signaling protocol in accordance with embodiments of the present invention.
Figure 3:
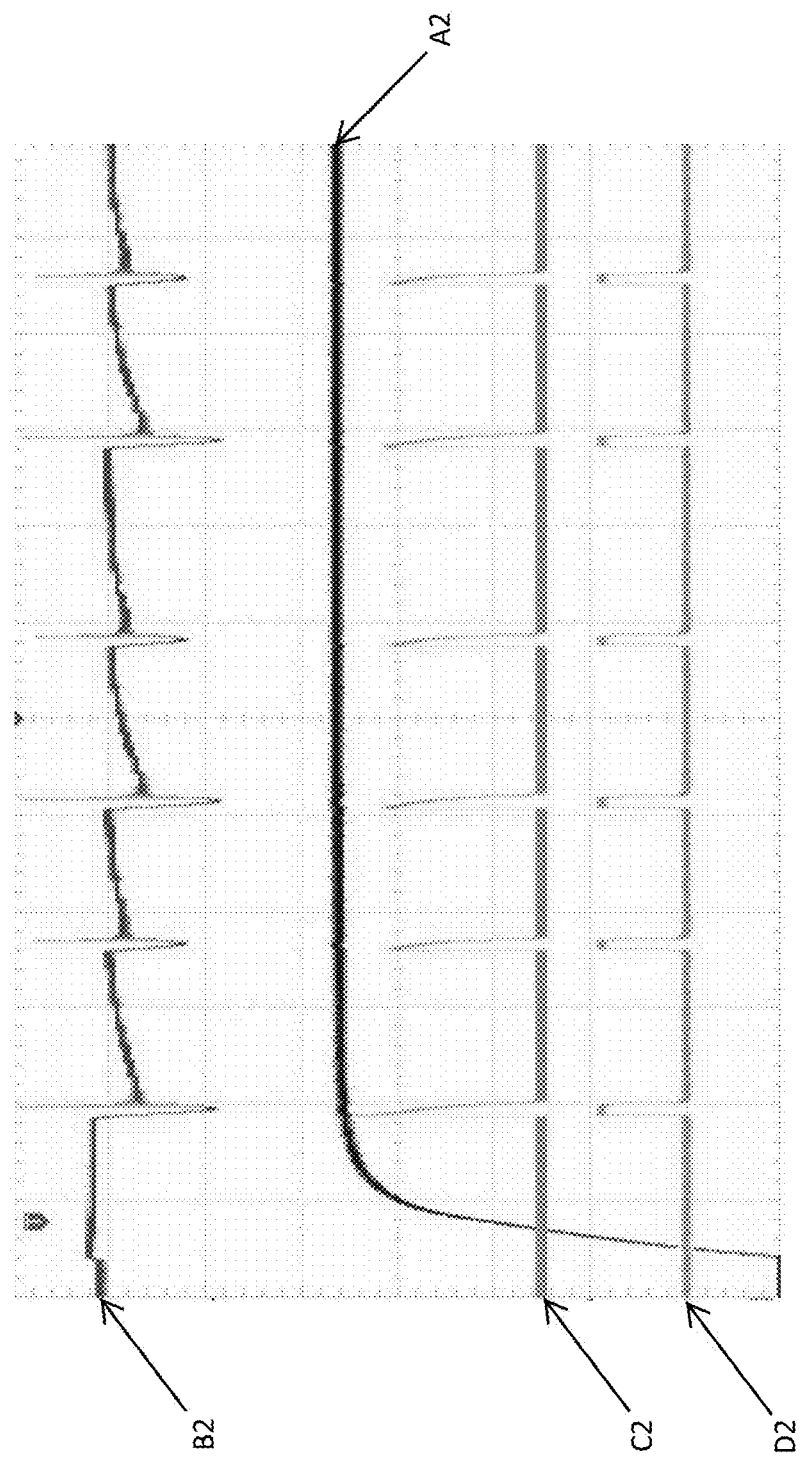
Figure 4:
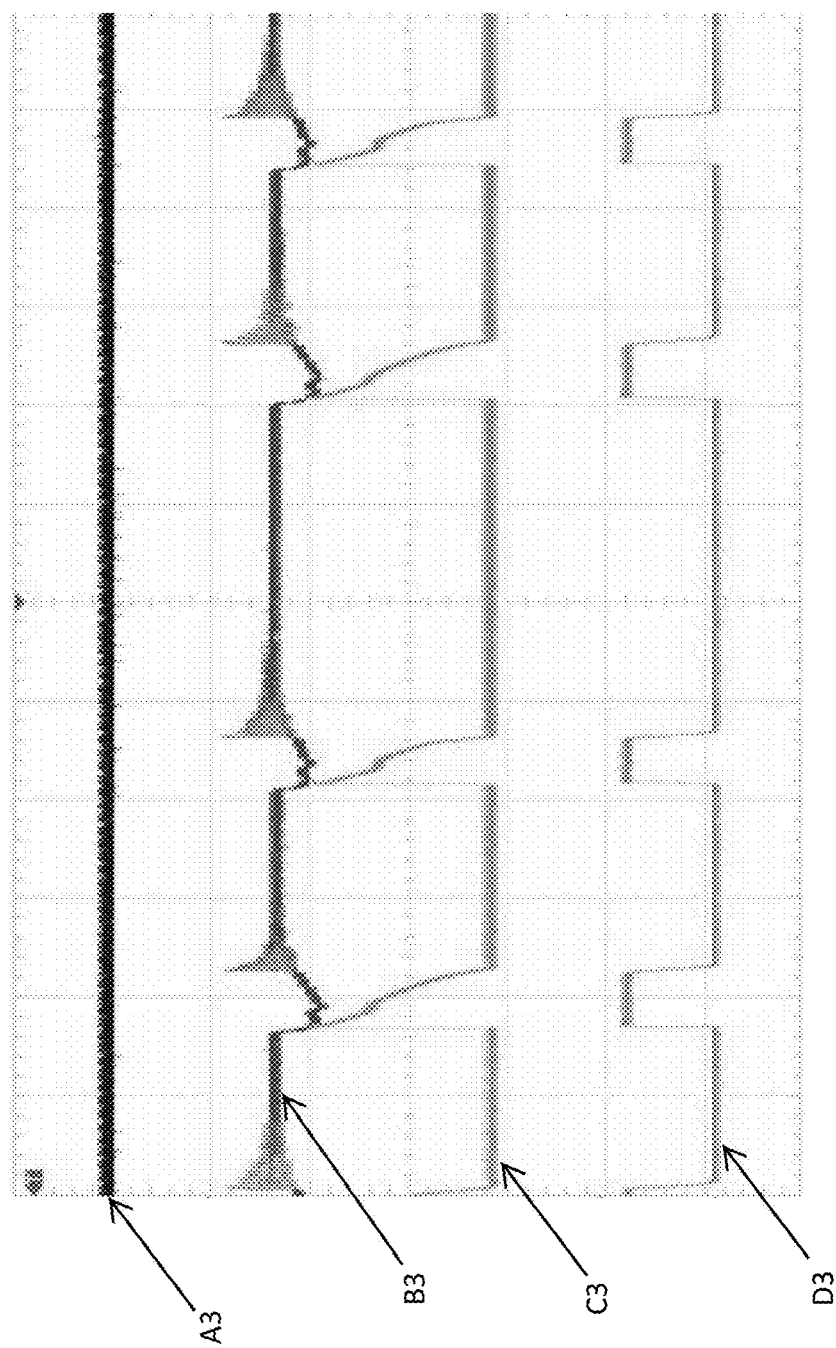
Figure 5:
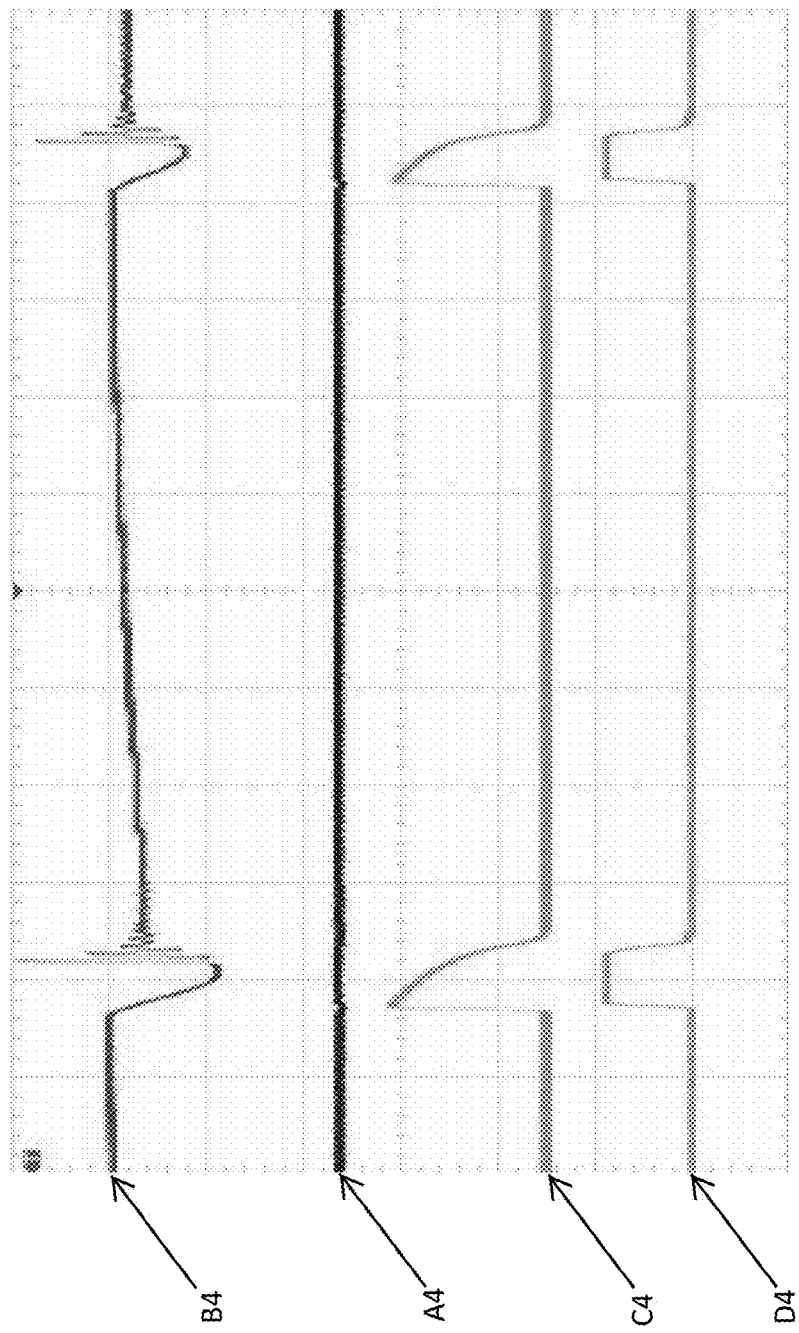

As illustrated, for a given strobe signal, a plurality of devices can communicate over a common differential pair, each communicating via a pair of signal pulses (e.g., FIG. 2 illustrates nine reporting devices as seen by nine signal pulses). The first of each pair may be configured to commence at a certain time offset from the leading edge of the strobe signal and the second of each pair may commence at a certain time offset (which as described herein, may correspond to a value from a sensor) relative the first of the pair. As illustrated, artifacts and ringing present in the current pulses may be attenuated or removed at each the input and output of the opto-isolator. It is further to be appreciated that systems and apparatuses in accordance with some embodiments of the present invention can be tuned, for example, to achieve a determined pulse signal depending on system characteristics and implementations (for example, and without limitation, system components, length of the multiconductor cable, and power supply characteristics).

Operational Overview

Figure 6:
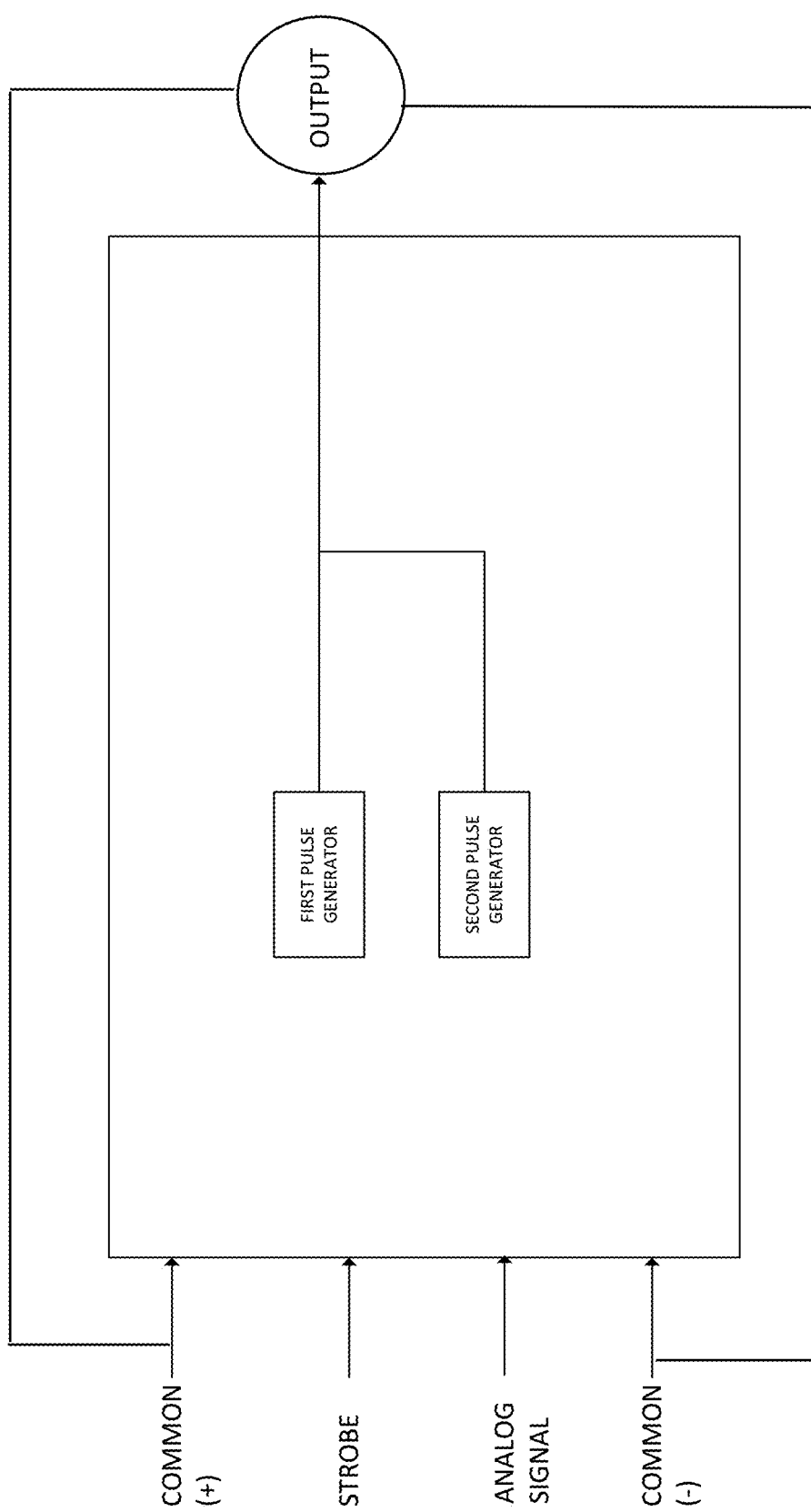
FIG. 6 is a diagram illustrating an exemplary simplified operation for generating current pulses in accordance with some embodiments of the present invention.

FIG. 6 is a diagram illustrating an exemplary simplified operation for generating current pulses in accordance with some embodiments of the present invention. A transducer, which may be generally described as an input-output device in the accompanying figure, may comprise a first pulse generator and a second pulse generator (each pulse generator shown in FIG. 6 generalizing the collection of electronic components for producing an electrical signal). The transducer may (i) receive as inputs a strobe signal, a common differential power pair, and an analog signal from a sensor and (ii) output a signal pair. As described above, when a strobe is activated and received by the transducer, the transducer may generate a first of a pair of signal pulses after a predetermined amount of time following the strobe, followed by a second of a pair of signal pulses, the second of the pair of signals following the first by a time determined by the magnitude of the analog signal from the sensor. In preferred embodiments, the signal pairs may comprise halfwave, cycle-limited impulses of current on a differentially-biased pair of a cable.

Referring to FIG. 6, an input-output device (e.g., a transducer) may receive an analog signal from a sensor, a strobe, and a common differential pair (shown as "COMMON (+) and COMMON (−)"), and produce therefrom an "output". In preferred embodiments, the "output" of the input-output device may comprise a pair of current pulses on the common differential pair. A first pulse generator, which may be generalize the electronic components for producing an electrical signal, may produce a first of a pair of current pulses in response to the strobe, and at a time relative to the strobe as pre-configured by electrical elements in the first pulse generator (for example, and without limitation, by pre-configured RC time constants). Following the first pulse, a second pulse generator may produce a second of the pair of current pulses, and at a time relative to the first of the pair of current pulses corresponding to the amplitude (or voltage, current, or resistance) of an analog signal (or variable resistance of some measurement component, such as, but not limited to, a thermistor). It is to be appreciated that multiple input-output devices, such as those illustrated in FIG. 6, may be connected in parallel to the strobe line and the common differential pair—each device having differing electrical elements to adjust the offset of the first of the current pulses relative to the strobe, and each receiving a different analog signal from an analog sensor.

Conceptual Circuit

Figure 7:
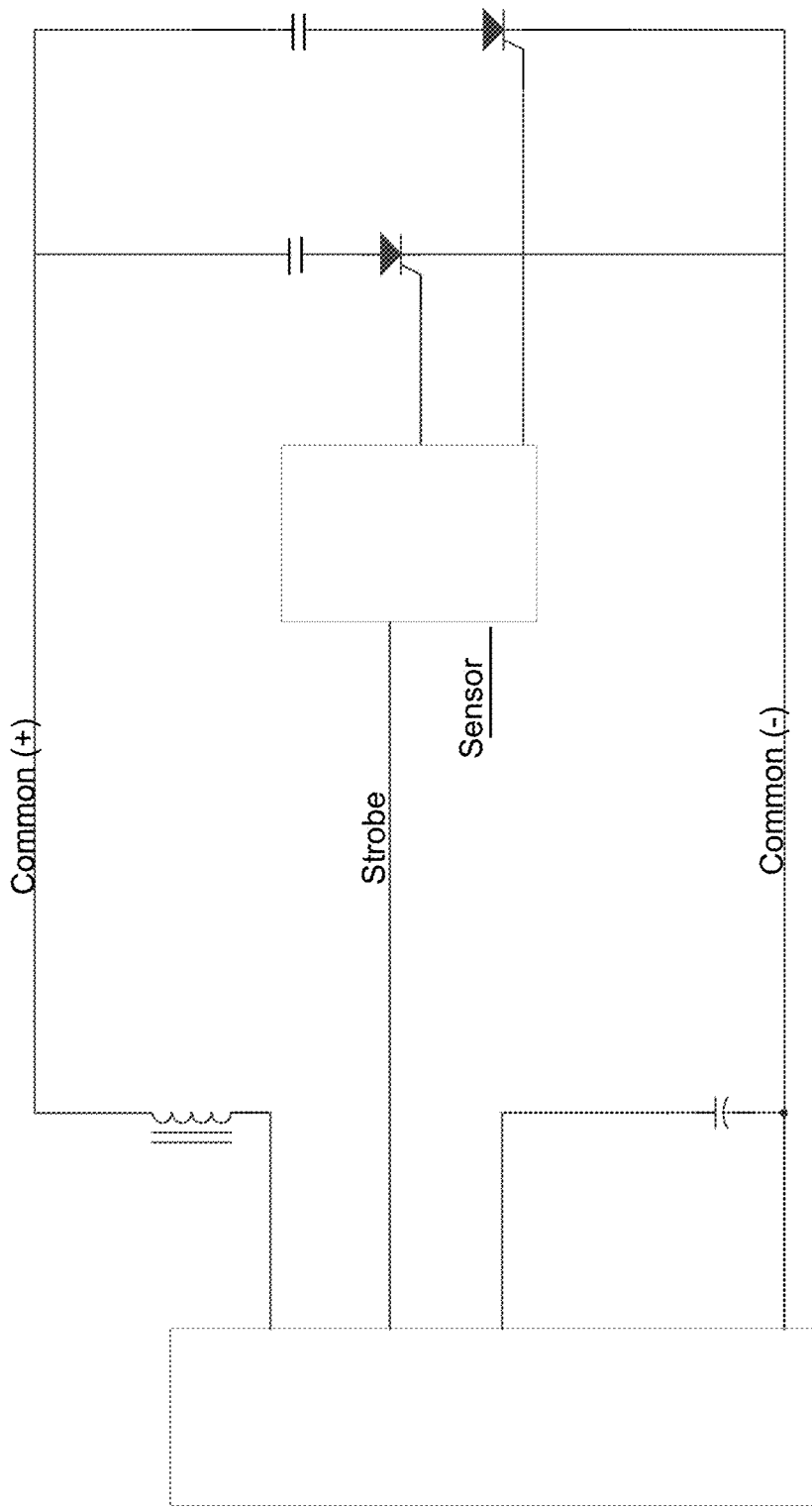
FIG. 7 is a conceptual schematic illustrating an exemplary simplified circuit for generating current pulses in accordance with some embodiments of the present invention.

FIG. 7 is a conceptual schematic illustrating an exemplary simplified circuit for creating current pulses in accordance with some embodiments of the present invention. Starting on the right side of FIG. 7, when an input-output device (represented by the smaller block) receives a signal from a strobe, a first current pulse may be generated at a predetermined time relative to the strobe (e.g., via the setting, or pre-configuration, of an RC time constant in the input-output device) by controlling the gate of a first thyristor (or silicon-controlled rectifier). The second current pulse may be generated by controlling the gate of a second thyristor (or silicon-controlled rectifier), the time between the first current pulse and the second current pulse corresponding to the amplitude of an analog signal (or voltage, current, or resistance of an electronic component manufactured to vary resistance in relationship to some stimulus, such as, but not limited to, pressure or temperature). In some implementations, inductors and capacitors may be provided within the common differential pair circuit to shape and enable the current pulses generated by triggering the thyristors.

In preferred embodiments, series capacitance may be provided at the anode of the thyristor by inclusion of a capacitor. Once latched by the triggering circuit, the thyristor may remain in a conduction state until such time that the series capacitor is near fully charged. Once the series capacitor is sufficiently charged, the thyristor may relax and the loop current through the differential pair may stop. It is to be appreciated that for all devices associated with the differential pair, only one thyristor should be in a conduction mode at any given time.

System Lines

Figure 8:
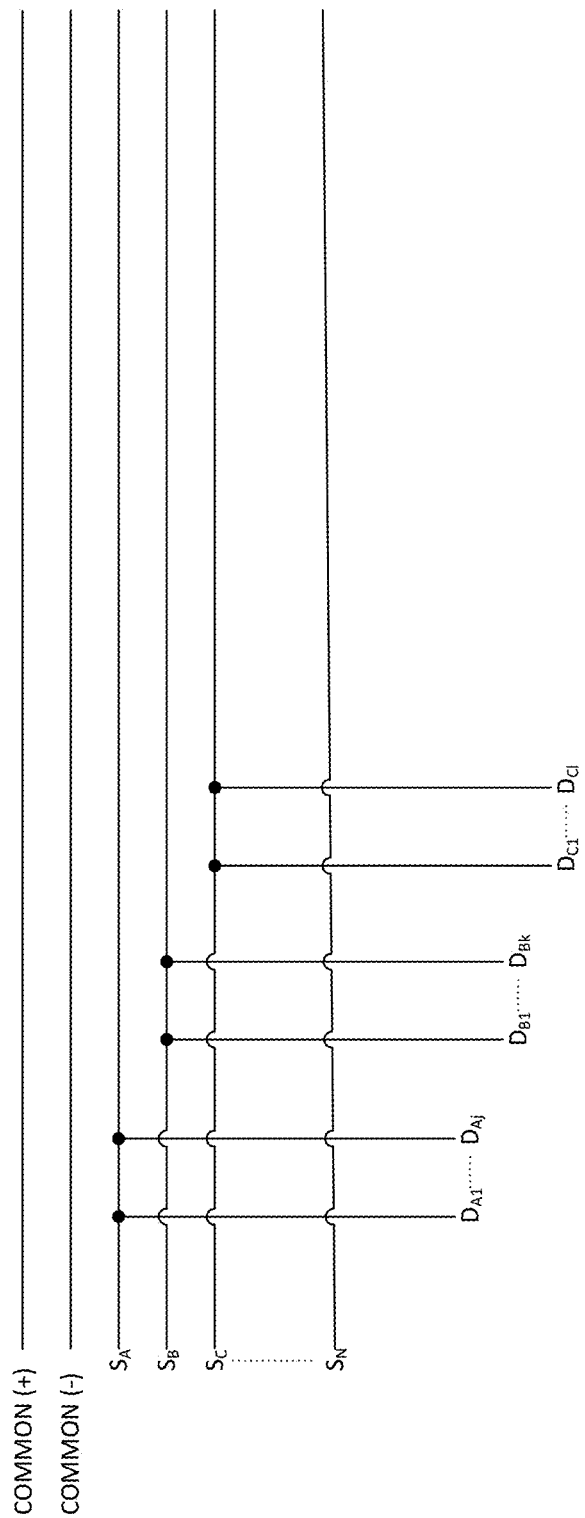
FIG. 8 is a diagram illustrating an exemplary bus line configuration for a system in accordance with some embodiments of the present invention.

FIG. 8 is a diagram illustrating an exemplary configuration for a system in accordance with some embodiments of the present invention having multiple strobe lines. The uppermost connection lines represent common and signal return lines (e.g., COMMON (+) and COMMON (−) as illustrated in FIGS. 6 and 7), and a series of strobe lines $S_A$, $S_B$, $S_C$ and $S_N$. It is to be appreciated that a single device, such as DAI, may be connected to a single strobe line, such as $S_A$, and to the common differential pair, such as COMMON (+) and COMMON (−) (although for simplicity, the connections between the common differential pair and the devices are not illustrated in FIG. 8).

In some implementations, a single strobe line may be provided, in which case the capacity of the implementation is "j" number of devices (e.g., input-output devices). In some other implementations, and as illustrated in FIG. 8, a plurality of strobe lines may be provided, and the resulting capacity of such implementation corresponds to the number of strobe lines and the number of devices associated with each strobe line. For example, and without limitation, a four-wire system may consist of COMMON (+), COMMON (−), strobe $S_A$ and strobe $S_B$. "J" number of devices may be engaged with $S_A$ as well as (unillustrated for convenience) COMMON (+) and COMMON (−), and "k" number of devices may be engaged with $S_B$ as well as (unillustrated for convenience) COMMON (+) and COMMON (−). Under such four-wire implementation, the system can handle "j" plus "k" number of devices.

Exemplary System Components

Figure 9:
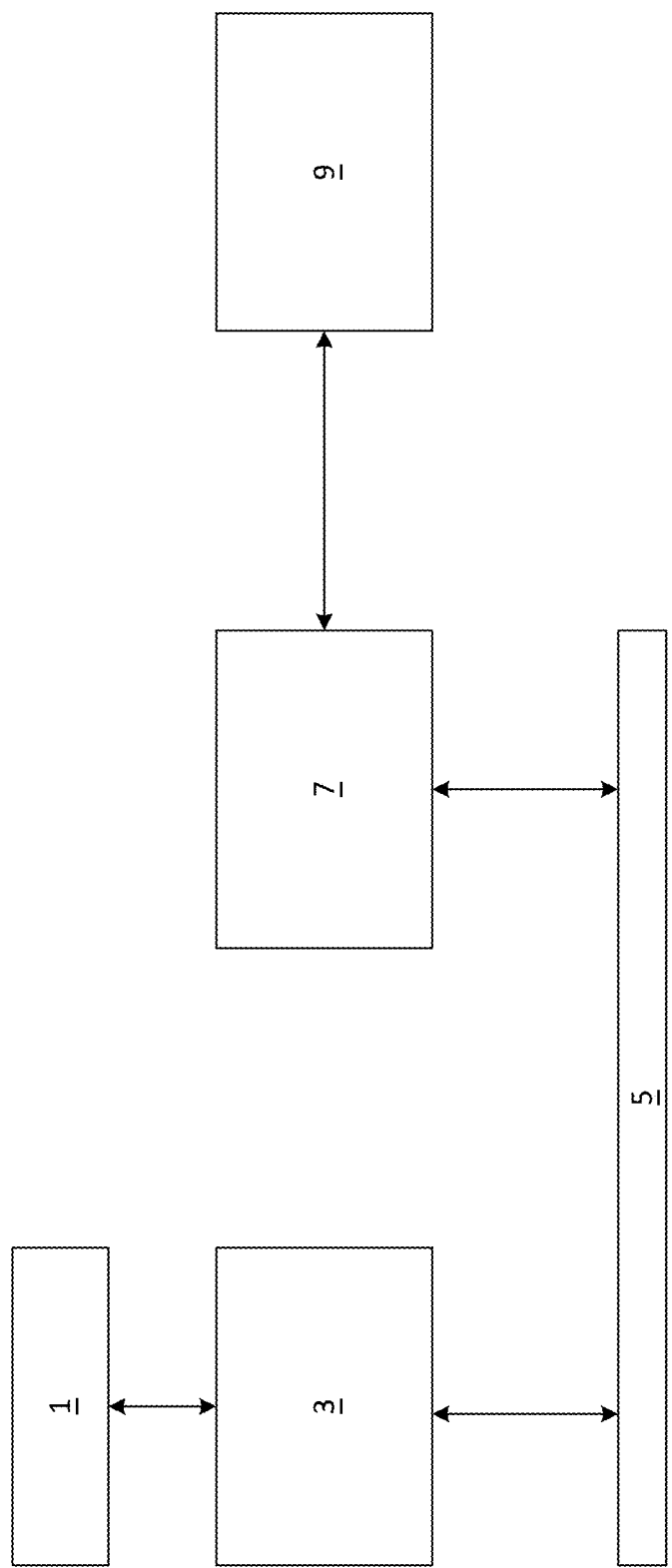
FIG. 9 is a diagram illustrating an exemplary system of electrical components in accordance with some embodiments of the present invention.

FIG. 9 is a diagram illustrating an exemplary system of electrical components in accordance with some embodiments of the present invention. As illustrated in FIG. 9, a system may generally include one or more sensors (such as sensor 1), one or more transducers (such as transducer 3), a multi-conductor cable 5, an interface 7, and a controller 9, where transducer(s) 3 and interface 7 may be electrically coupled to multi-conductor cable 5, sensor(s) 1 may be electrically coupled with transducer(s) 3, and interface 7 may be electrically coupled with controller 9.

In some embodiments, one or more transducers may each receive an analog signal from a sensor and produce therefrom a pair of signals at a time relative to a strobe line of the multi-conductor cable, where the spacing (i.e., time interval between the first and the second of the pair of signals) is proportional to the respective signals from the sensors. The pair of signals, in some implementations a pair of current pulses, may then be propagated along a differential pair of the multi-conductor cable to an interface where the time interval between the pairs of signals may be determined. The determined time intervals may then be parsed and/or scaled and provided to a controller where the values of the analog signals provided by the sensors to the transducers may be processed and utilized in one or more control processes.

Signal Pair Characteristics and Time Interval Determination

In preferred embodiments, the signal pairs produced by the transducers (e.g., the pairs as illustrated in FIG. 1 by the pulse generator illustrated in FIG. 6) may be a sequence of tuned, unipolar, high current, half-wave, cycle-limited pulse (bookend) events that are conducted on an electrically biased, differential wire bus pair of the multi-conductor cable. It is to be appreciated that coexistence of unipolar pulses on a differential pair is not mutually incompatible. In some embodiments, ringing and opposite polarity artifacts in the current signals resulting from the initial conduction may be suppressed and/or filtered.

In preferred implementations, spectrally, the tuned-filtered peak energy may be centered at between 20 KHz and 100 kHz (10 uS<tpw<50 uS). In preferred implementations, the pulses may comprise an energy magnitude of about 20 uJ. It is to be appreciated that the signal characteristics of the pulses may be different than those described above, and systems and apparatuses may be configured to produce pulses having different characteristics as determined, among other things, by the distance from the transducer to the multiplexer, the length and physical characteristics and construction of the multi-conductor cable, and potential interference sources to the system.

In some implementations, the leading edges of the pulse pairs may be sampled and filtered so as to validate that the pulse is in the correct spectrum for the analog bus pulse spectral profile (e.g., to eliminate RF interference or other induced, parasitics or ringing signals). One method of filtering the pulse pairs may include logically AND'd the leading edges with a predetermined and defined pulse bandwidth.

It is to be appreciated that systems and apparatuses in accordance with embodiments of the present invention may enable the deployment and scaling of hundreds of analog sensors coupled onto a single differential pair. Provided that the signal pair characteristics and method of validating and recovering pulses and the time interval between the first and the second of a pair of pulses are optimized for the implementation, there may be practically no limit to the number of analog sensors which may be utilized with a single differential pair.

Transducer Schematic

Figure 10:
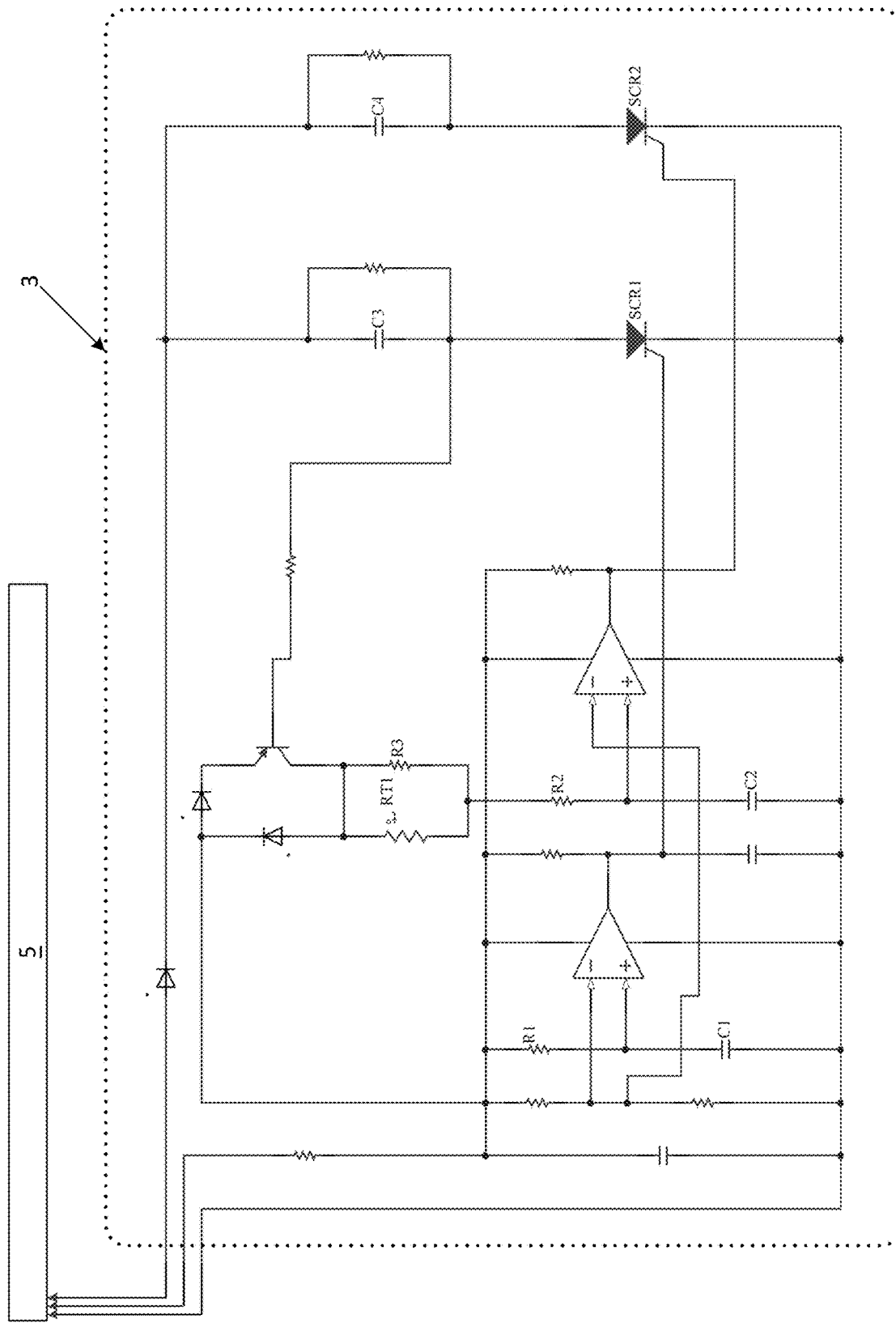
FIG. 10 is a schematic illustrating an exemplary transducer circuit in accordance with some implementations of the present invention.

FIG. 10 is a schematic illustrating an exemplary transducer circuit in accordance with some implementations of the present invention. As further illustrated in FIG. 10, transducer 3 may be electrically coupled to multi-conductor cable 5. In preferred embodiments, a plurality of transducers may be coupled to a common multi-conductor cable (although FIG. 10 illustrates a single exemplary transducer).

In some implementations, a sensor may consist of a dedicated resistive device embedded in the transducer design, such as a thermistor or pressure sensor. For example, and as illustrated, a thermistor RT1 may be coupled to the transducer circuitry. In some other implementations, the transducer may comprise a port for receiving an input from an external sensor. For example, and without limitation, the transducer may comprise a two-wire port that receives a signal from an external 4-20 mA sensor (see, e.g., the example of FIG. 11 depicting port H1 and isolator FSRC F1).

In the example of FIG. 10, the values of a first resistor R1 and a first capacitor C1 may be selected with reference to the desired timing offset between the strobe enable and the first of the pulse pairs generated (e.g. $T_1$ as illustrated in the example of FIG. 1). The values of a second capacitor C2, a second resistor R2, and a third resistor R3 may be selected with reference to the relative offset between the first of the pulse pairs and the second of the pulse pairs (e.g. $TI_1$ as illustrated in the example of FIG. 1), giving due deference to the range of thermistor RT1 and the desired range of delay between the first of the pulse pairs and the second of the pulse pairs. For example, and without limitation, second capacitor C2, second resistor R2, and third resistor R3 may be selected to produce a maximum delay of 250 uS for a given resistive load of thermistor RT1.

Simplified System Design

Figure 11:
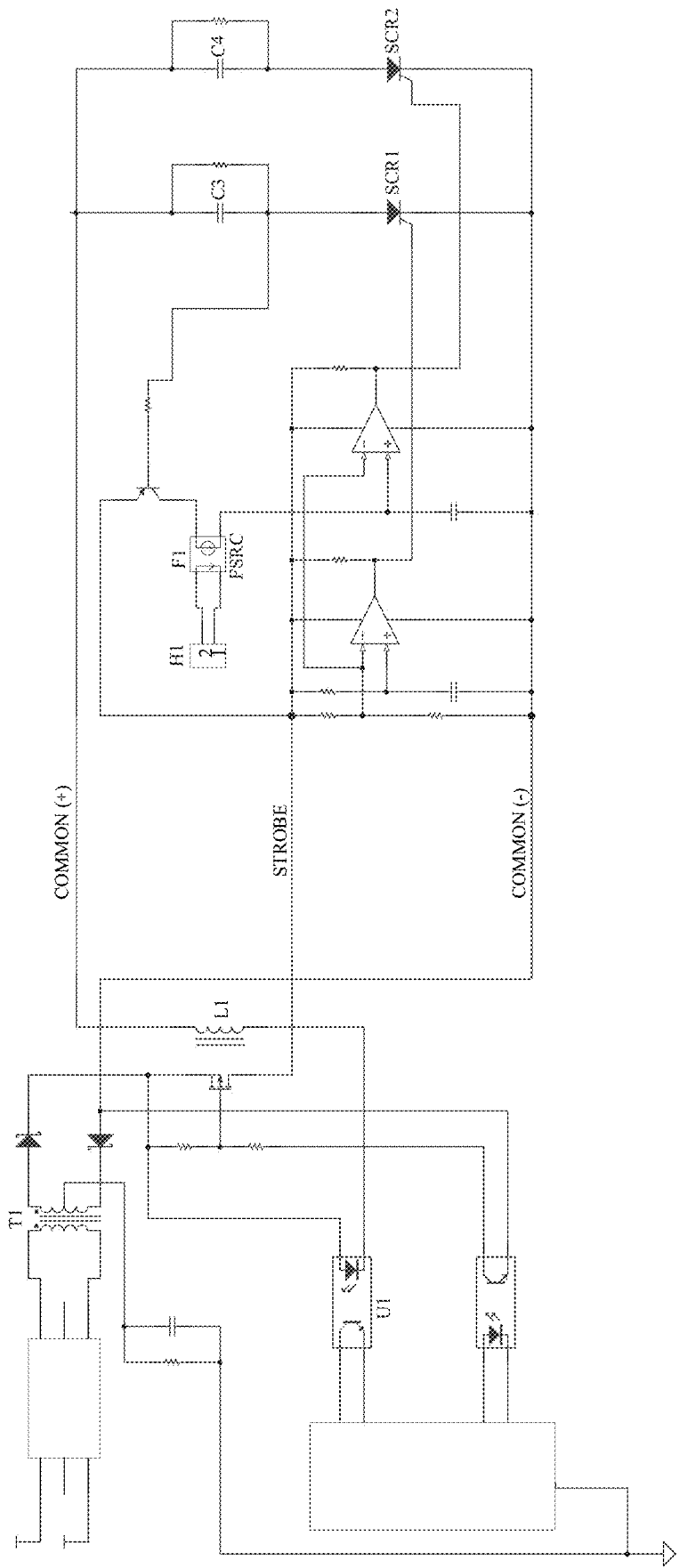
FIG. 11 is a schematic illustrating an exemplary system in accordance with some implementations of the present invention.

FIG. 11 is a conceptual schematic illustrating an exemplary system in accordance with some implementations of the present invention. It is to be appreciated that this illustration is not meant to provide all details of a functional system, but rather, is intended to provide a generalized overview of a system in accordance with some embodiments of the present invention.

As illustrated, the common differential pair may be biased. A bias potential is impressed across the COMMON (+) and COMMON (−) via a transformer T1. It is important to note that the common differential pair is not ground referenced and the presence or absence of high intensity loop current events delineate and define pulse pair events. Electrically, the critically essential high impulse current events may be produced or generated when a first thyristor SCR1 or a second thyristor SCR2, each with a capacitor C3 and C4, respectively, in series with its anode, is triggered.

With respect to the circuit topology, at the interface, the bias potential may be supplied through the drive-side of an opto-isolator U1, in series with an inductor L1, which may then be coupled to one of the differential pairs (e.g., COMMON (+)).

The first and second of the current pulses may be generated in similar ways. To illustrate, with reference to the first of the current pulses, when the gate of SCR1 is triggered, SCR1 closes a current loop, causing high impulse current to flow from the bias supply source (e.g., through transformer T1) serially through the drive-side of opto-isolator U1, inductor L1, through COMMON (+), SCR1 anode capacitor C3, then returns via the thyristor SCR1 cathode to COMMON (−). Because the bias supply may be a floating supply, and the current pulse may be read, detected or evaluated by proxy after passing through the input side of opto-isolator U1, the signal information may have true differential (non-ground referenced) nature that makes the signals, noise immune and very robust.

The high impulse current may continue to flow in this loop until the thyristor anode capacitor (e.g., C3 or C4) charges to a point where the current through the loop, and therefore through the thyristor (e.g., SCR1 or SCR2), decays to below the thyristor "holding current", at which point the thyristor becomes unlatched.

In practical examples of various implementations, the pulse width may be between 10 and 30 microseconds and may be tuned and optimized by the interface. This tuning of the impulse current events to render the maximum energy (in joules) from the signal may allow the high impulse current event pulses to be unambiguous—that is, they are not subject to false indications, even in noisy environments or where cable lengths are very long.

Exemplary System Components

Figure 12:
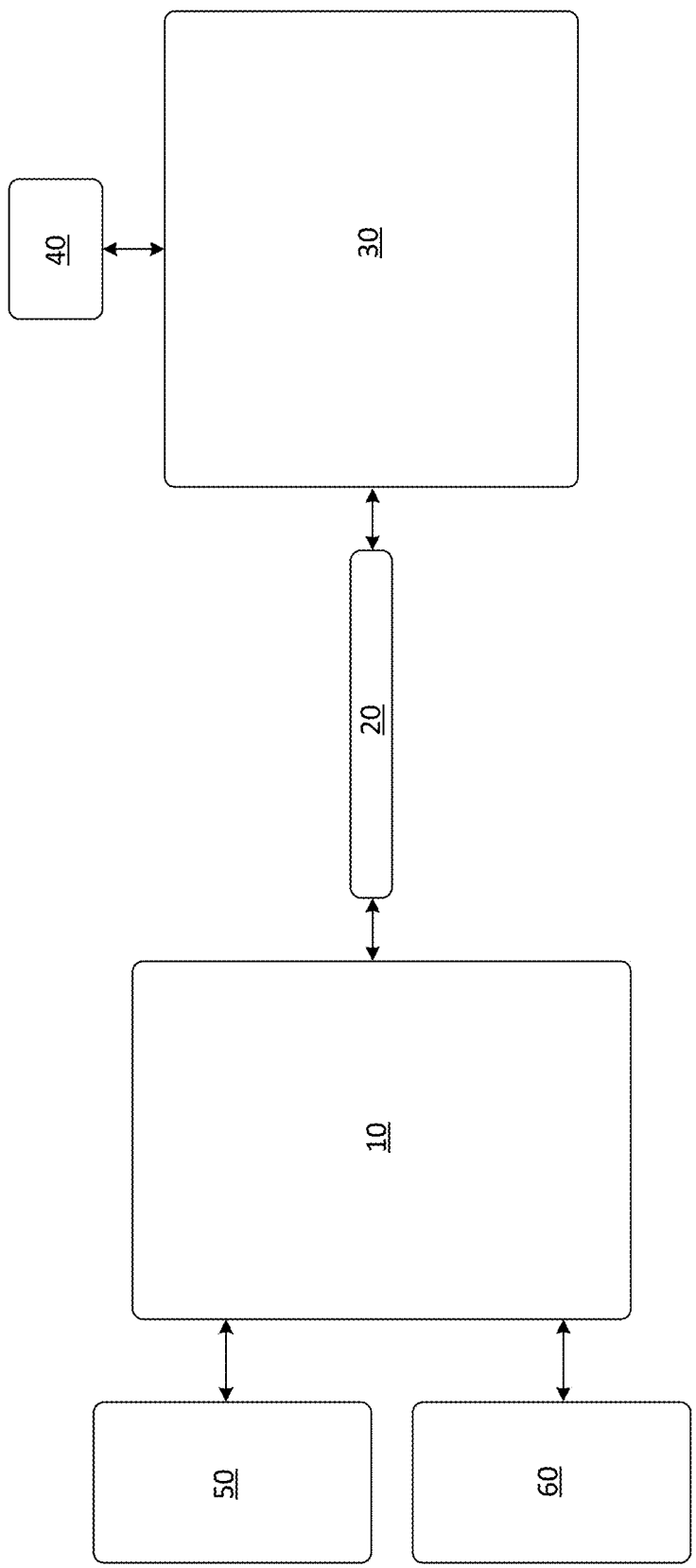
FIG. 12 is a diagram illustrating an exemplary system of electrical components in accordance with some embodiments of the present invention.

FIG. 12 is a diagram illustrating an exemplary system of electrical components in accordance with some embodiments of the present invention. As illustrated in FIG. 12, a system may generally include an interface 10, a multi-conductor cable 20, one or more transducers (such as transducer 30), one or more sensors (such as sensor 40), an isolated power supply 50, and a microcontroller unit 60, where interface 10 and transducer(s) 30 may be coupled with multi-conductor cable 20, sensor(s) 40 may be coupled with transducer(s) 30, and interface 10 may be coupled with isolated power supply 50 and microcontroller unit 60. In some embodiments, a multi-conductor cable may comprise one or more strobe lines and a differential power line having a common positive line and a common negative line.

Interface

Figure 13:
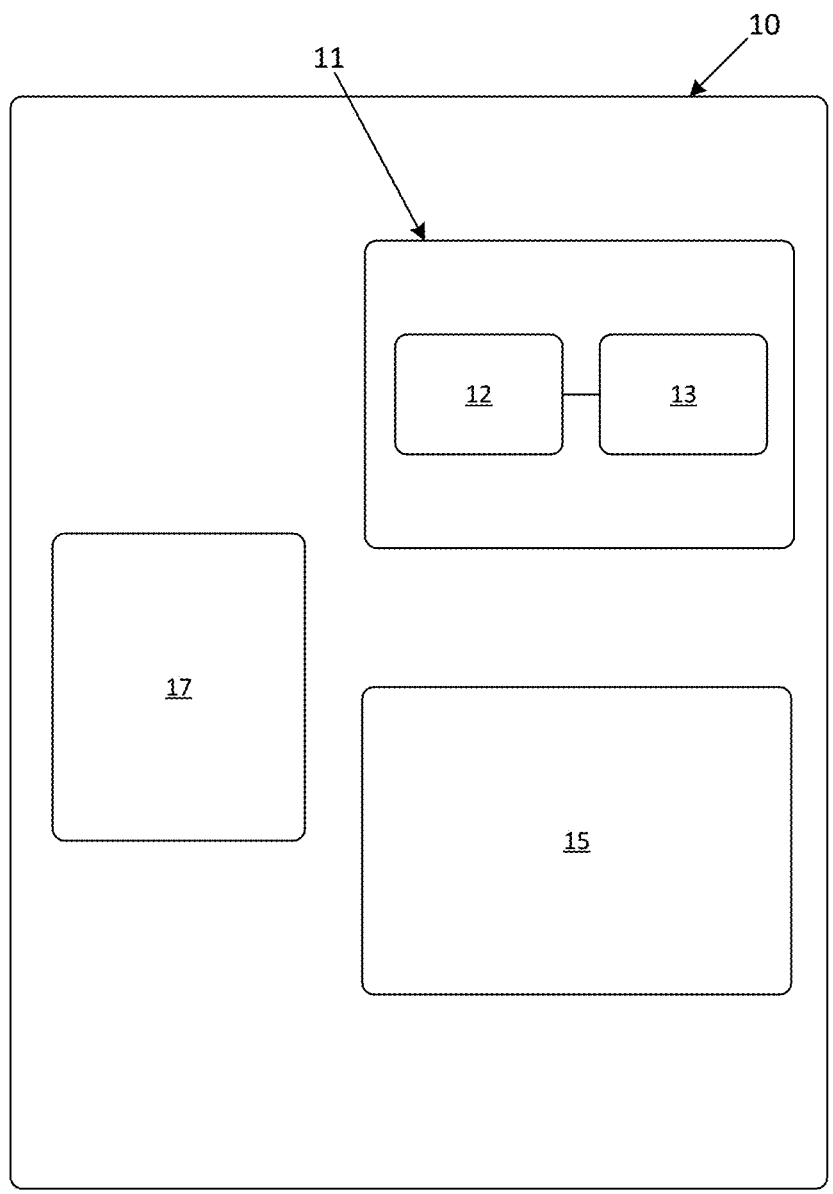
FIG. 13 is a diagram illustrating exemplary electrical components of the interface illustrated in FIG. 12.
Figure 14:
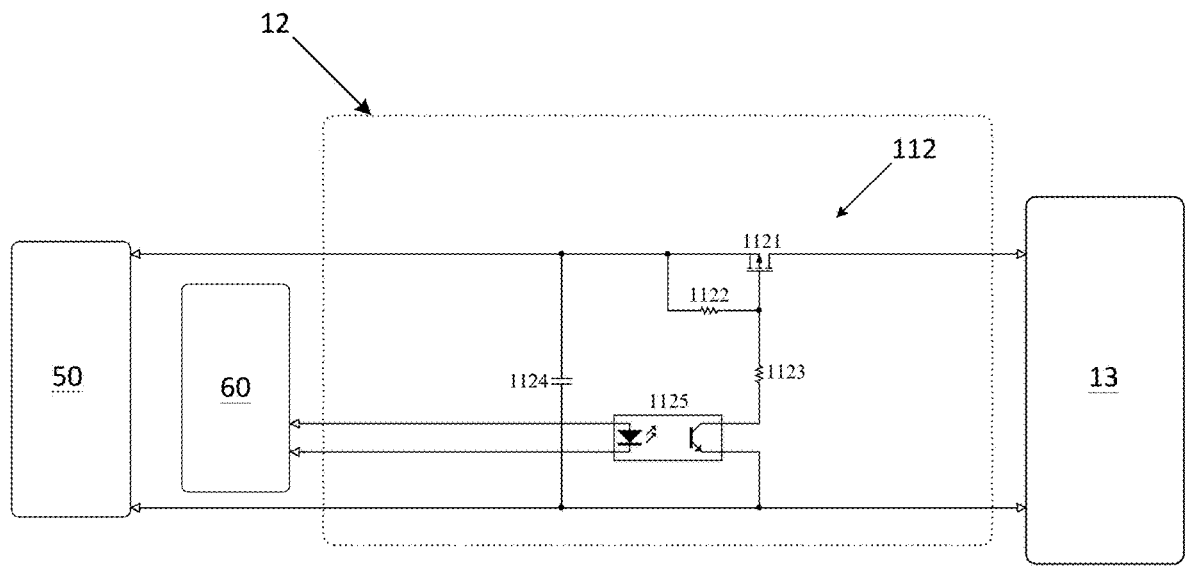
FIG. 14 is a diagram illustrating a schematic of an exemplary strobe driver circuit of a strobe stage of an interface in accordance with some implementations of the present invention.

Referring now to FIG. 13, in some embodiments, the electrical components of interface 10 may be generalized by a strobe stage 11, an acquisition stage 15, and, optionally, a fault detection stage 17. Strobe stage 11 may generalize the electrical components for producing a strobe signal along a strobe line of multi-conductor cable 20 and filtering prefiltering undesired harmonics from transmission on the multi-conductor cable. As further illustrated in FIG. 13, strobe stage 11 may comprise a strobe driver 12 and a filter 13. Strobe driver 12 may generalize the electrical components for producing current to flow along a strobe line of multi-conductor cable 20. In some implementations, and as illustrated in FIG. 14, a strobe driver circuit 112 may be coupled with isolated power supply 50, microcontroller unit 60, and filter 13 and may include a field-effect transistor 1121, a first resistor 1122, a second resistor 1123, a capacitor 1124, and an opto-isolator 1125. When driven by a signal from microcontroller unit 60, strobe driver circuit 112 switches the positive side (potential) of isolated power supply 50 (and associated current flow). Control is achieved by pulling down (negative) the voltage divider formed by first resistor 1122 and second resistor 1123 (via a conduction path through opto-isolator 1125) thereby bringing the gate of field-effect transistor 1121 sufficiently negative to cause conduction—thus causing a current to flow in the strobe line of multi-conductor cable 20 (including through filter 13). The return current path for this conduction loop may be provided by the common negative line of multi-conductor cable 20. This conduction action manifests a strobe signal across/between the strobe and common lines, which is sufficiently uniform over some desired (predetermined) strobe pulse width (time period) to elicit electrical responses from transducer(s) 30. The parasitic junction capacitance of field-effect transistor 1121 may be leveraged to limit (control) the otherwise fast turn-on of field-effect transistor 1121 output current. This may be accomplished via deliberate selection of divider resistors found on the gate of field-effect transistor 1121.

Figure 15:
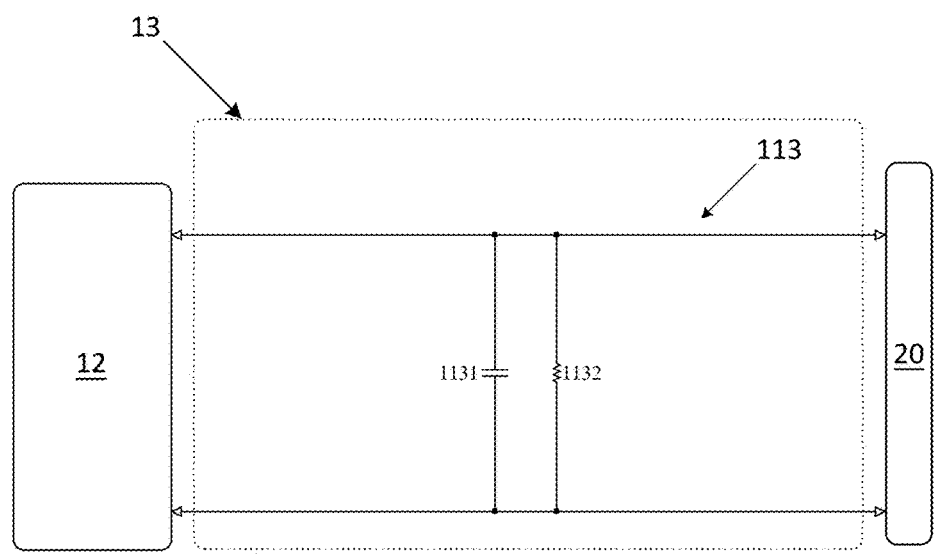
FIG. 15 is a diagram illustrating a schematic of an exemplary filter circuit of a strobe stage of an interface in accordance with some implementations of the present invention.

Filter 13 of strobe stage 11 may generalize the electrical components for shunting any signals from parallel conductors and/or suppressing any remaining components of strobe driver 12 or harmonics. In some implementations, and as illustrated in FIG. 15, a filter circuit 113 may be coupled with strobe driver 12 and multi-conductor cable 20 and may include a capacitor 1131 and a resistor 1132. The parallel capacitance provided by capacitor 1131 both shunts any induced, or otherwise coupled, signals from parallel conductors to the common negative line of multi-conductor cable 20 and suppresses any remaining (i.e., undesirable or parasitic) out-of-band frequency components from strobe driver 12 or any harmonics that may result from high speed switching. The parallel resistance provided by resistor 1132 may function as a bleeder for capacitor 1131 and any parasitic cable capacitance. The parallel resistance may also provide pull-down path for field-effect transistor 1121 of strobe driver circuit 112 and may also provide a shunt for unwanted coupled signals on the strobe line(s) when in an idle state.

Figure 16:
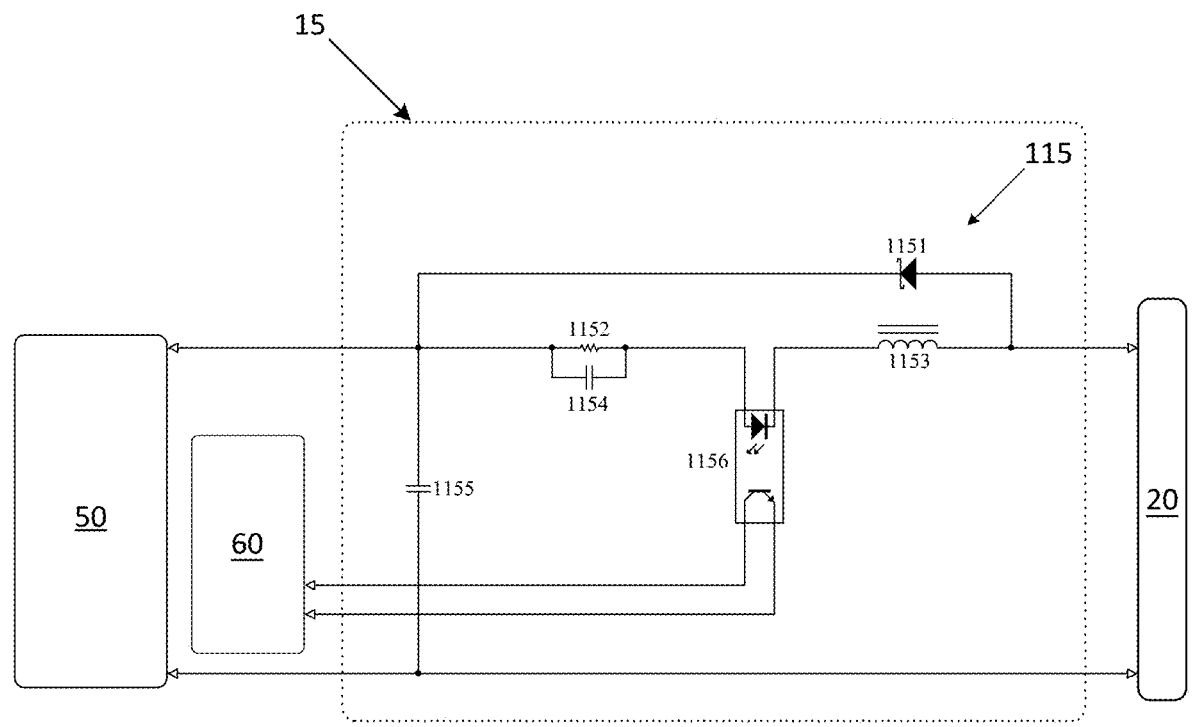
FIG. 16 is a diagram illustrating a schematic of an exemplary acquisition stage circuit in accordance with some implementations of the present invention.

Acquisition stage 15 may generalize the electrical components for receiving one or more signals from one or more transducers 30. Acquisition stage 15 may comprise an isolation device (for example, and without limitation, a transformer or opto-isolator) implemented in series with a DC-bias potential and associated current path including an inductor (providing current limiting resistance, active and/or passive), and in some embodiments bypassed by an appropriate capacitor. In some implementations, and as illustrated in FIG. 16, an acquisition stage circuit 115 may be coupled with isolated power supply 50, microcontroller unit 60, and multi-conductor cable 20, and may include diode 1151 (in a preferred embodiment, a Schottky diode), a resistor 1152, an inductor 1153, a first capacitor 1154, a second capacitor 1155, and an opto-isolator 1156. These electrical components may aggregately form a tuned, cycle-limited (half-wave) LCR circuit when coupled with transducer(s) 30 and the thyristors therein. The single cycle nature of the current pulse events can be optimized for maximum energy transfer (signal conveyance) and with a Schottky diode (e.g., diode 1151), can enhance the overall optimization of the cycle-limited pulse events.

Figure 17:
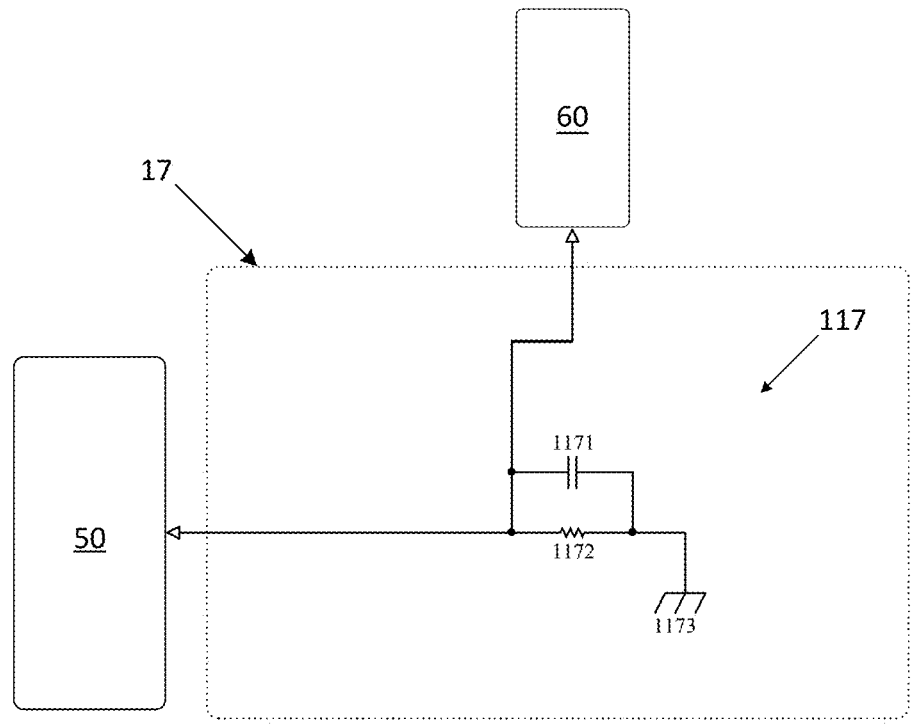
FIG. 17 is a diagram illustrating a schematic of an exemplary fault detection stage circuit in accordance with some implementations of the present invention.

Fault detection stage 17 may generalize the electrical components for detecting asymmetric currents drawn on the signal return or the common negative line to ground by extraneous paths (parasitic currents). In some implementations, and as illustrated in FIG. 17, a fault detection stage circuit 117 may be coupled with isolated power supply 50 and microcontroller unit 60 and may include a capacitor 1171, a resistor 1172, and a ground reference 1173. Any asymmetric currents on the signal return or common (negative) to ground reference 1173 would cause a signal to appear across resistor 1172 which may be detected by microcontroller unit 60 to drive a fault indicator and/or provide messaging functionality.

Transducers

Figure 18:
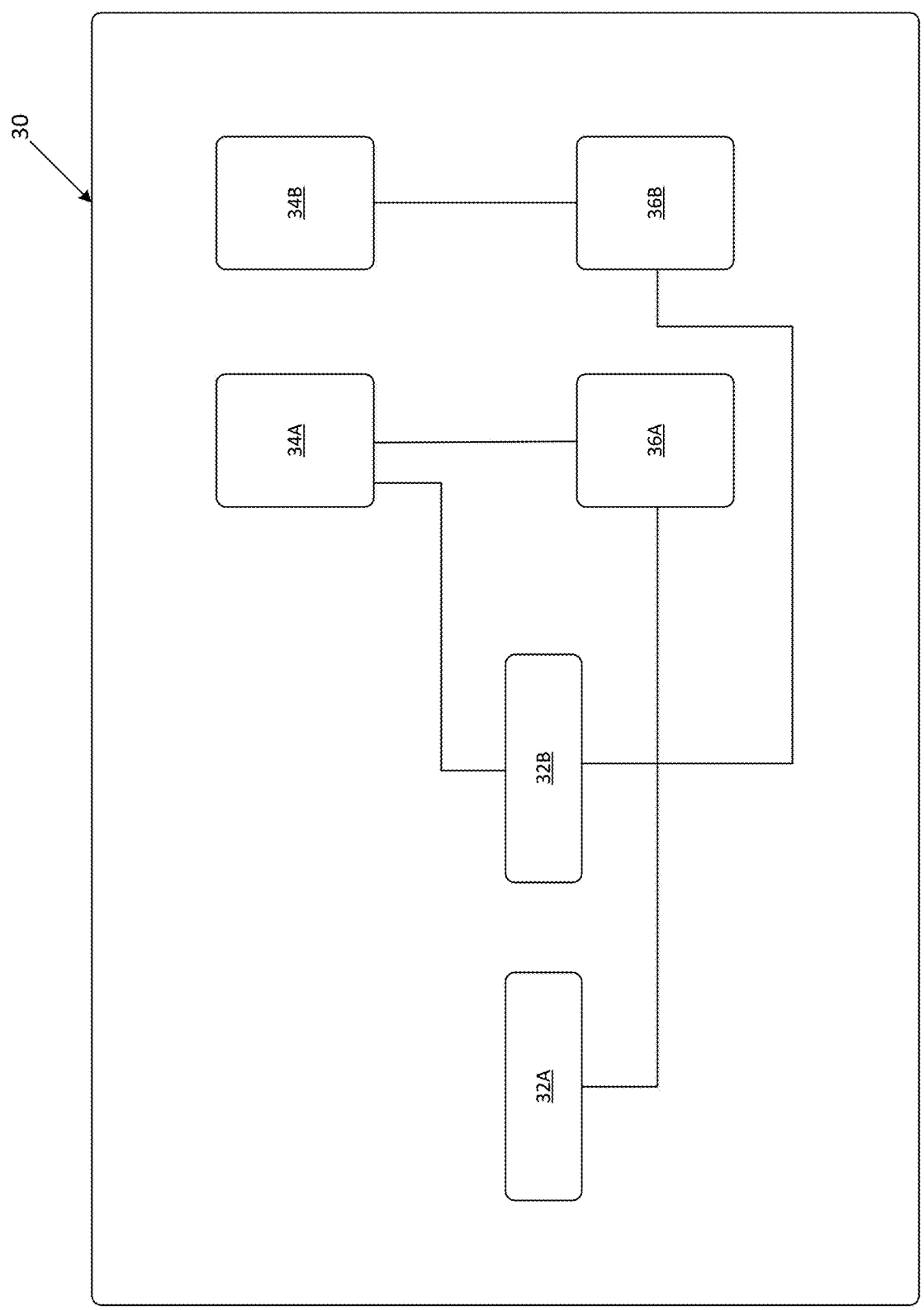
FIG. 18 is a diagram illustrating exemplary electrical components of the transducer illustrated in FIG. 12.

Referring now to FIG. 18, the electrical components of transducer(s) 30 may be generalized by a transducer identifier trigger 32A, a sensor value trigger 32B, transducer identifier coupling 34A, sensor value coupling 34B, transducer identifier conduction 36A, and sensor value conduction 36B. Transducer identifier trigger 32A may be coupled with transducer identifier conduction 36A, and transducer identifier conduction 36A may be coupled with transducer identifier coupling 34A. Sensor value trigger 32B may be coupled with sensor value conduction 36B, and sensor value conduction 36B may be coupled with sensor value coupling 34B. It is to be appreciated that, in some preferred embodiments, the second pulse (electrical impulse) produced by the transducer corresponding to the analog sensor value may be offset in the time domain from the first pulse. Accordingly, in some preferred embodiments, sensor value trigger 32B may further be coupled with transducer identifier coupling 34A.

Figure 19:
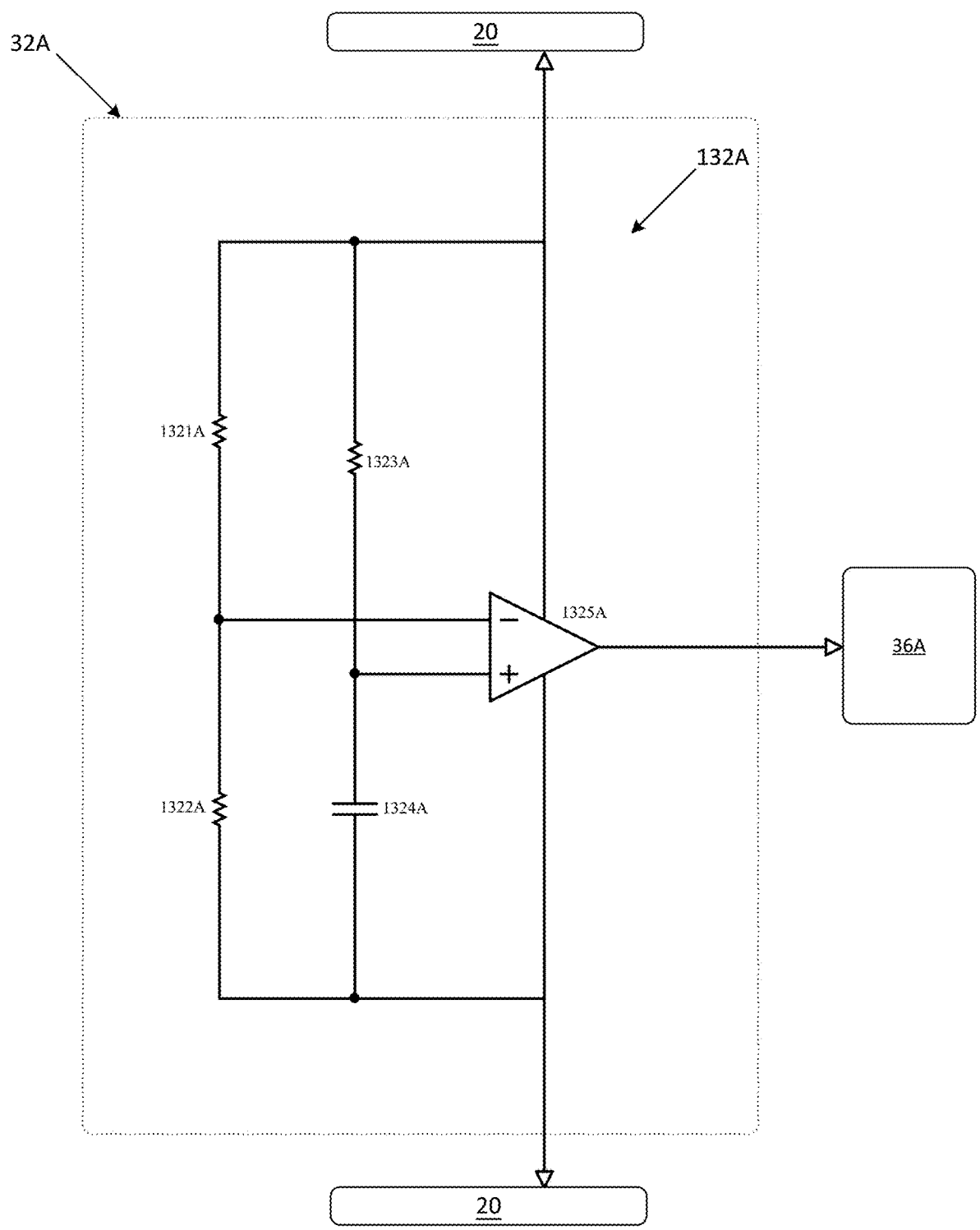
FIG. 19 is a diagram illustrating a schematic of an exemplary transducer identifier trigger circuit in accordance with some implementations of the present invention.

Transducer identifier trigger 32A may generalize the electrical components for receiving a strobe signal and, after an interval of time with respect thereto (which may be based on the selection and/or configuration of the electrical components), produce a first pulse of a trigger signal that is provided to a transducer identifier coupling (in some embodiments, a thyristor). In some implementations, and as illustrated in FIG. 19, transducer identifier trigger may comprise transducer identifier trigger circuit 132A which may be coupled with multi-conductor cable 20 and transducer identifier conduction 36A. Transducer identifier trigger circuit 132A may include comparator 1325A having a positive supply coupled to a strobe line of multi-conductor cable 20 and a negative supply coupled to a common (−) line of multi-conductor cable 20. Transducer identifier trigger circuit 132A may further include first resistor 1321A and second resistor 1322A to form a strobe line voltage divider having a midpoint node coupled to the inverting input of comparator 1325A. Transducer identifier trigger circuit 132A may also include an RC decay circuit comprising third resistor 1323A and capacitor 1324A having a midpoint node coupled to the non-inverting input of comparator 1325A. Transducer identifier trigger circuit 132A may commence, at the beginning of a strobe period, comparing the divided strobe line signal with the decayed strobe signal from the RC decay circuit (comprising resistor 1323A and capacitor 1324A). After a given time interval, when the voltage level of capacitor 1324A reaches the voltage level of the center node of the divider formed by first resistor 1321A and second resistor 1322A, the output of comparator 1325A (and thus transducer identifier trigger circuit 132A) is driven to be high, providing a trigger signal to transducer identifier conduction 36A. It is to be thusly appreciated that transducer identifier trigger circuits can, with reference to component selection (namely, selection of resistors 1321A, 1332A, and 1323A, and capacitor 1324A), be configured to produce a trigger signal to transducer identifier conduction 36A at a determined time relative to the leading edge of the strobe signal.

Figure 20:
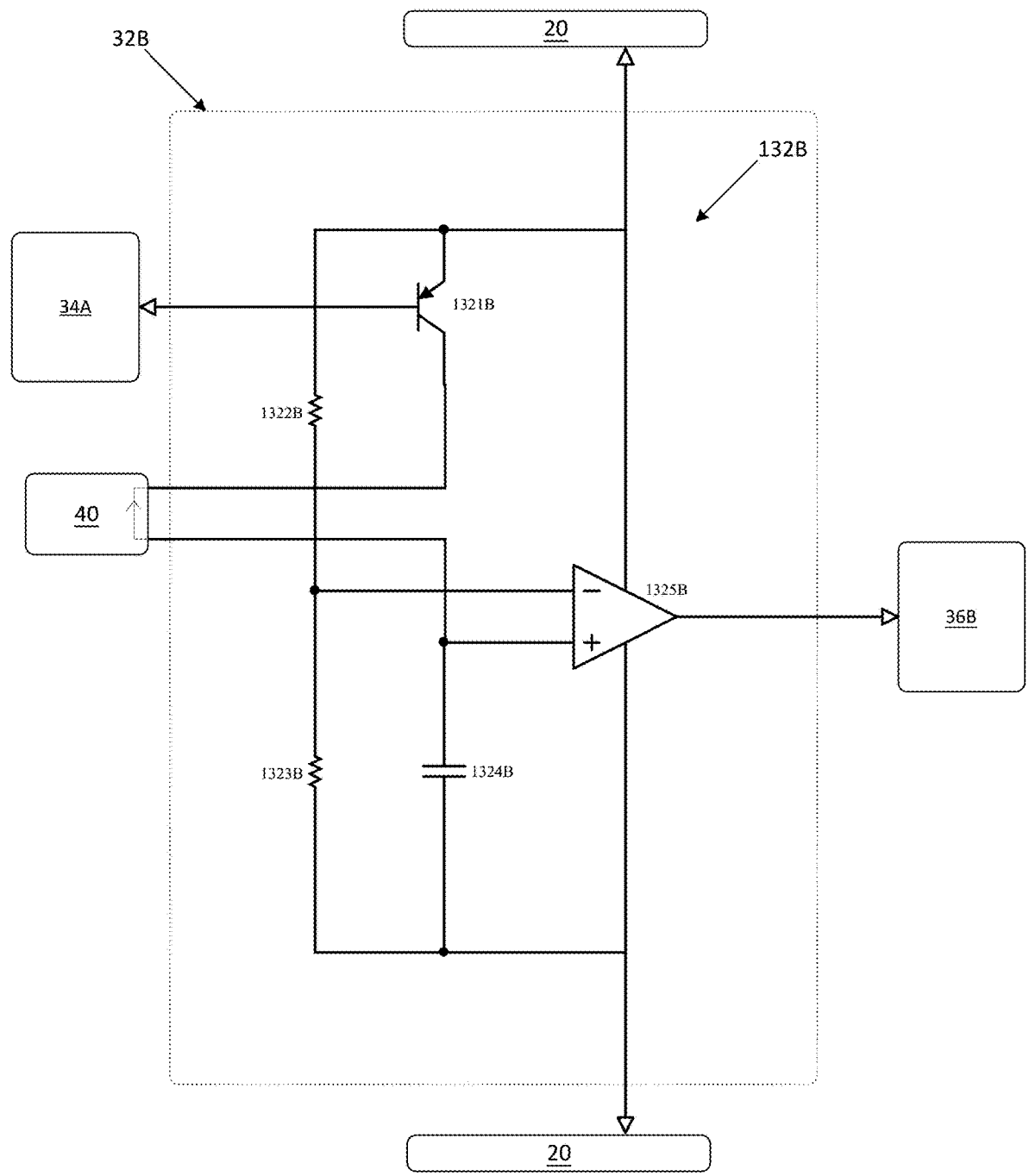
FIG. 20 is a diagram illustrating a schematic of an exemplary sensor value trigger circuit in accordance with some implementations of the present invention.

In a similar fashion, sensor value trigger 32B may generalize the electrical components for receiving an analog input from a sensor and, after an interval of time with respect thereto, produce a second pulse of a trigger signal that is provided to a sensor value coupling (in some embodiments, a thyristor). In some implementations, and as illustrated in FIG. 20, sensor value trigger may comprise sensor value trigger circuit 132B which may be coupled with multi-conductor cable 20, sensor value identifier conduction 36B, sensor 40, and transducer identifier coupling 34A. Sensor value trigger circuit 132B may include comparator 1325B having a positive supply coupled to a strobe line of multi-conductor cable 20 and a negative supply coupled to a common (−) line of multi-conductor cable 20. Sensor value trigger circuit 132B may further include first resistor 1322B and second resistor 1323B to form a strobe line voltage divider having a midpoint node coupled to the inverting input of comparator 1325B. Sensor value circuit 132B may further comprise transistor 1321B and capacitor 1324B, in series with sensor 40, and having a midpoint node coupled to the non-inverting input of comparator 1325B. It is to be appreciated that the charge-current path of the capacitor 1324B includes sensor 40, which may consist of a series resistor, resistance(s), and/or a current source (which could be, at least in part, comprised of current provided by a sensor), and as such sensor 40 and capacitor 1324B may effectively function as an RC decay circuit. The charge rate of capacitor 1324B thus varies in proportion with a characteristic of sensor 40. Sensor value trigger circuit 132B may compare the divided strobe line signal with the decayed strobe signal from the RC decay circuit (comprising sensor 40 and capacitor 1324B). After a given time interval, when the voltage level of capacitor 1324B reaches the voltage level of the center node of the divider formed by first resistor 1322B and second resistor 1323B, the output of comparator 1325B (and thus sensor value trigger circuit 132B) is driven to be high, providing a trigger signal to sensor value conduction 36B. It is to be appreciated that sensor value trigger circuits can, with reference to component selection (namely, selection of resistors 1322B, 1323B, capacitor 1324B, and transistor 1321B, along with the electrical characteristics of sensor 40), be configured to produce a trigger signal to sensor value conduction 36B at a time both relative to the current pulse generated by the transducer identifier conduction (e.g., the latching of transducer identifier conduction 136A) and scaled over the range of output of the sensor.

Figure 21:
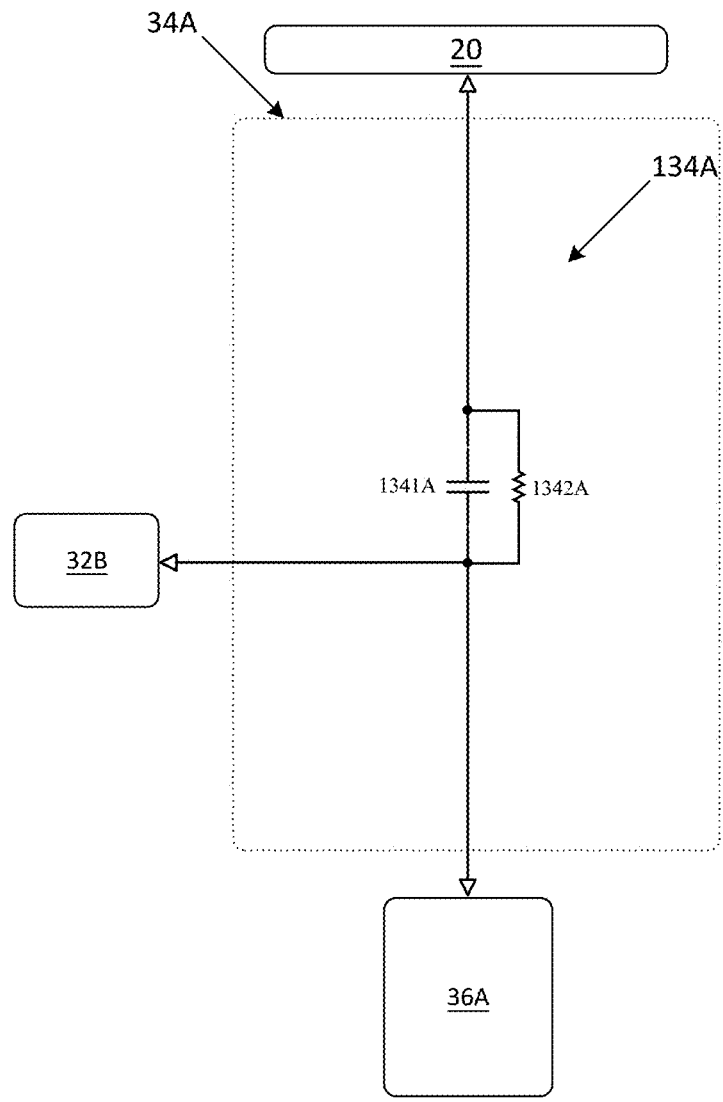
FIG. 21 is a diagram illustrating a schematic of an exemplary transducer identifier coupling circuit in accordance with some implementations of the present invention.

Transducer identifier coupling 34A may generalize the electrical components for drawing a high-impulse current. In some embodiments, an transducer identifier coupling circuit may consist of a capacitor and parallel bleeder resistor, and may be placed in series with a thyristor (or SCR) or other latching bistable switching device (which may be part of transducer identifier conduction 36A). In some implementations, and as illustrated in FIG. 21, a transducer identifier coupling circuit 134A may be coupled with a common (+) line of multi-conductor cable 20 and transducer identifier conduction 36A, and may include a capacitor 1341A and a resistor 1342A. Once the transducer identifier conduction 36A is placed in latched state, transducer identifier coupling circuit 134A draws a high impulse current until capacitor 1341A reaches a state of charge sufficient that the current drops below the latch holding current of transducer identifier conduction 36A (for example, and without limitation, the holding current of thyristor 1361A of transducer identifier conductor 136A). In some embodiments, transducer identifier coupling 34A may further be coupled, at a node between transducer identifier coupling circuit 134A and transducer identifier conductor 36A, to sensor value triggering circuit 134A (for example, and without limitation, to the gate of transistor 1321B).

Figure 22:
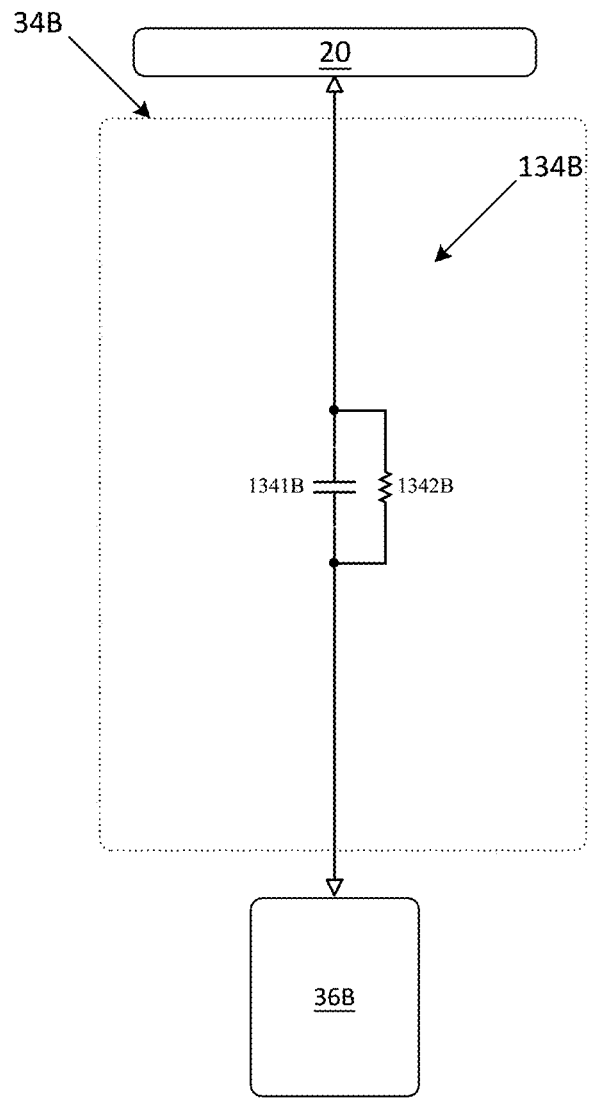
FIG. 22 is a diagram illustrating a schematic of an exemplary sensor value coupling circuit in accordance with some implementations of the present invention.

Sensor value coupling 34B may generalize the electrical components for drawing a high-impulse current. In some embodiments, a sensor value coupling circuit may consist of a capacitor and parallel bleeder resistor, and may be placed in series with a thyristor (or SCR) or other latching bistable switching device (which may be part of sensor value conduction 36B). In some implementations, and as illustrated in FIG. 22, a sensor value coupling circuit 134B may be coupled with a common (+) line of multi-conductor cable 20 and sensor value conduction 36B, and may include a capacitor 1341B and a resistor 1342B. Once the sensor value conduction 36B is placed in latched state, sensor value coupling circuit 134B draws a high impulse current until capacitor 1341B reaches a state of charge sufficient that the current drops below the latch holding current of sensor value conduction 36B (for example, and without limitation, the holding current of thyristor 1361A of transducer identifier conductor 136A).

Figure 23:
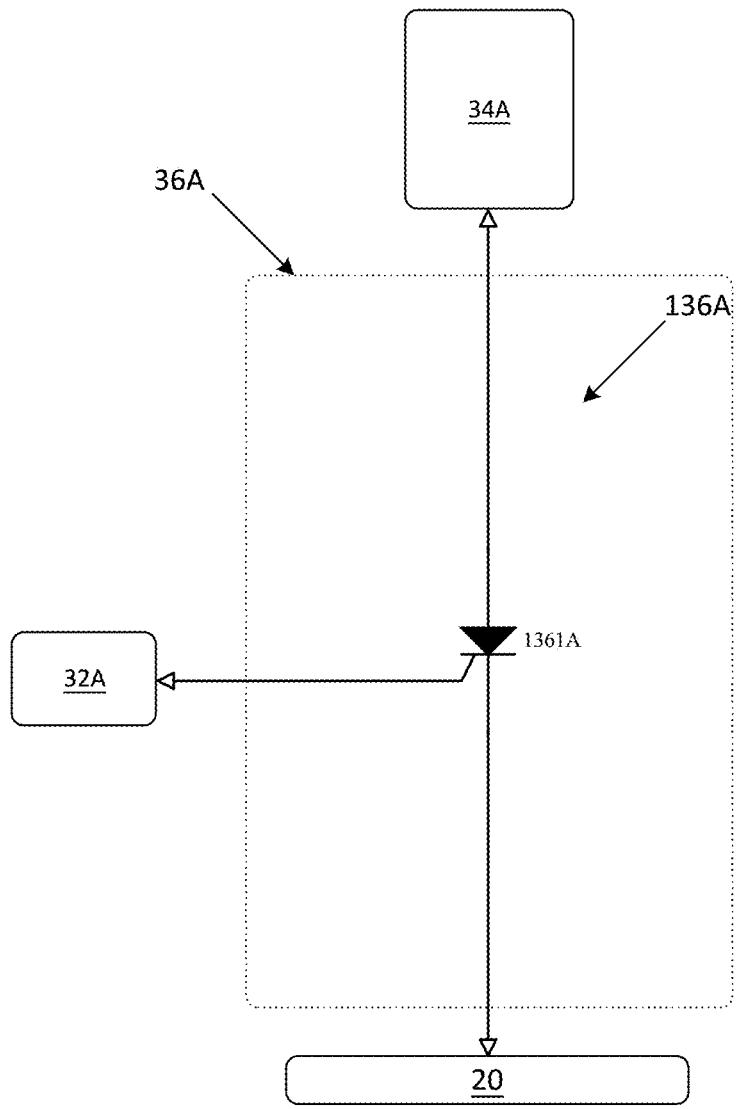
FIG. 23 is a diagram illustrating a schematic of an exemplary transducer identifier conduction circuit in accordance with some implementations of the present invention.

Transducer identifier conduction 36A may generalize the electrical components for receiving a trigger signal and, based thereon, producing a current pulse. In some implementations, and as illustrated in FIG. 23, transducer identifier conduction circuit 136A may be coupled with a common (−) line of multi-conductor cable 20, transducer identifier trigger 32A, and transducer identifier coupling 34A. In preferred embodiments, transducer identifier trigger circuit 136A may include a latching bistable switch (or collection of devices that form a half-wave, single-cycle latch), preferably a thyristor 1361A. It is to be appreciated that once thyristor 1361A is triggered, it will conduct current for a single tuned-pulse. The tuned pulse is with reference to the charge cycle of the reactive components within the current loop of the common differential pair, including but not limited to the isolated power supply (for example, and without limitation, isolated power supply 50), the series collection of LCR components (for example, and without limitation, those of transducer identifier coupling circuit 134A, multi-conductor cable 20, and acquisition stage circuit 115), along with loop parasitics. The conduction will persist until the reactive components within transducer identifier coupling 34A charge to a sufficient point and the loop-current drops below the holding current threshold of the switch.

Figure 24:
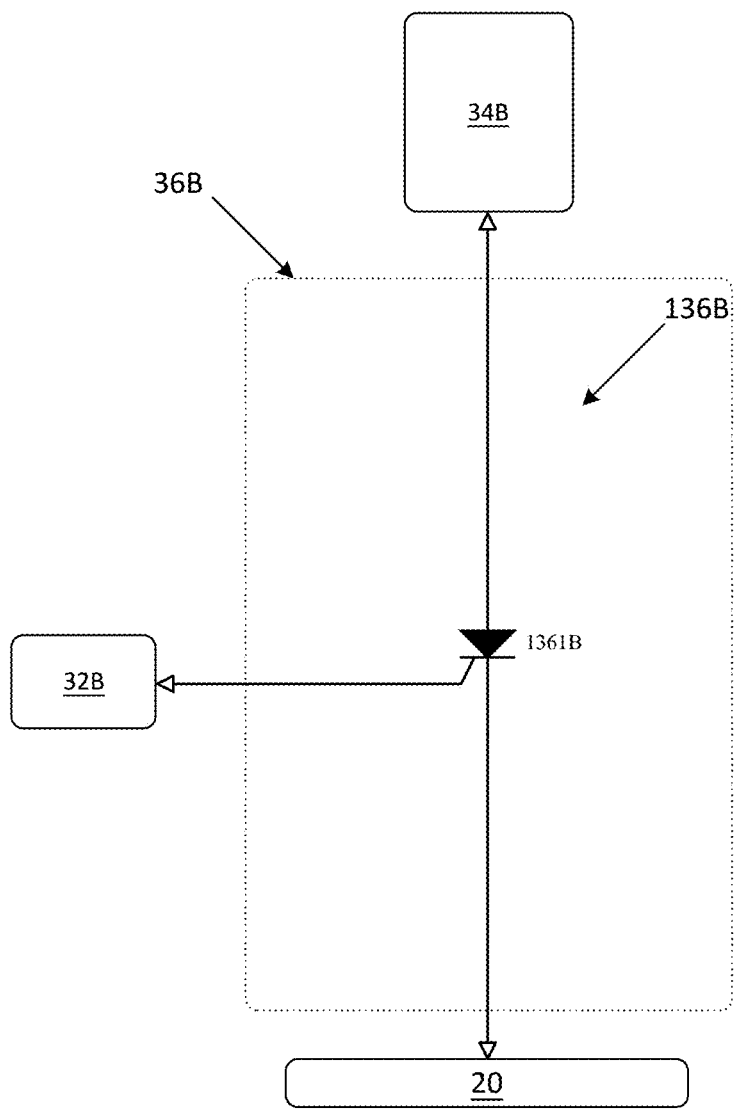
FIG. 24 is a diagram illustrating a schematic of an exemplary sensor value conduction circuit in accordance with some implementations of the present invention.

Sensor value conduction 36B may generalize the electrical components for receiving a trigger signal and, based thereon, producing a current pulse. In some implementations, and as illustrated in FIG. 24, sensor value conduction circuit 136B may be coupled with a common (−) line of multi-conductor cable 20, sensor value trigger 32B, and sensor value coupling 34B. In preferred embodiments, sensor value trigger circuit 136B may include a latching bistable switch (or collection of devices that form a half-wave, single-cycle latch), preferably a thyristor 1361B. It is to be appreciated that once thyristor 1361B is triggered, it will conduct current for a single tuned-pulse. The tuned pulse is with reference to the charge cycle of the reactive components within the current loop of the common differential pair, including but not limited to the isolated power supply (for example, and without limitation, isolated power supply 50), the series collection of LCR components (for example, and without limitation, those of sensor value coupling circuit 134B, multi-conductor cable 20, and acquisition stage circuit 115), along with loop parasitics. The conduction will persist until the reactive components within sensor value coupling 34B charge to a sufficient point and the loop-current drops below the holding current threshold of the switch.

System Design

Figure 25:
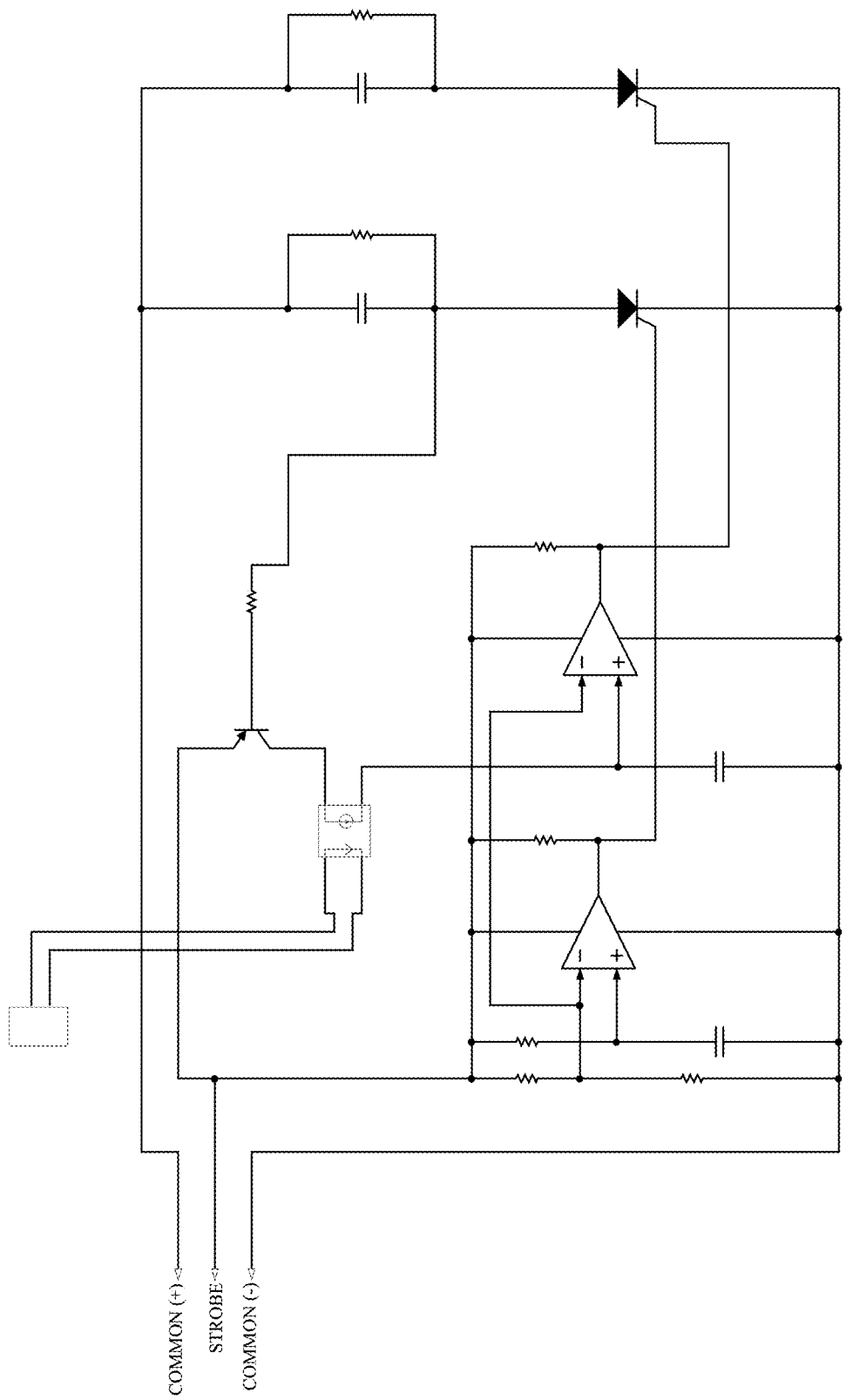
FIG. 25 is a schematic illustrating an exemplary transducer circuit in accordance with some implementations of the present invention.
Figure 26:
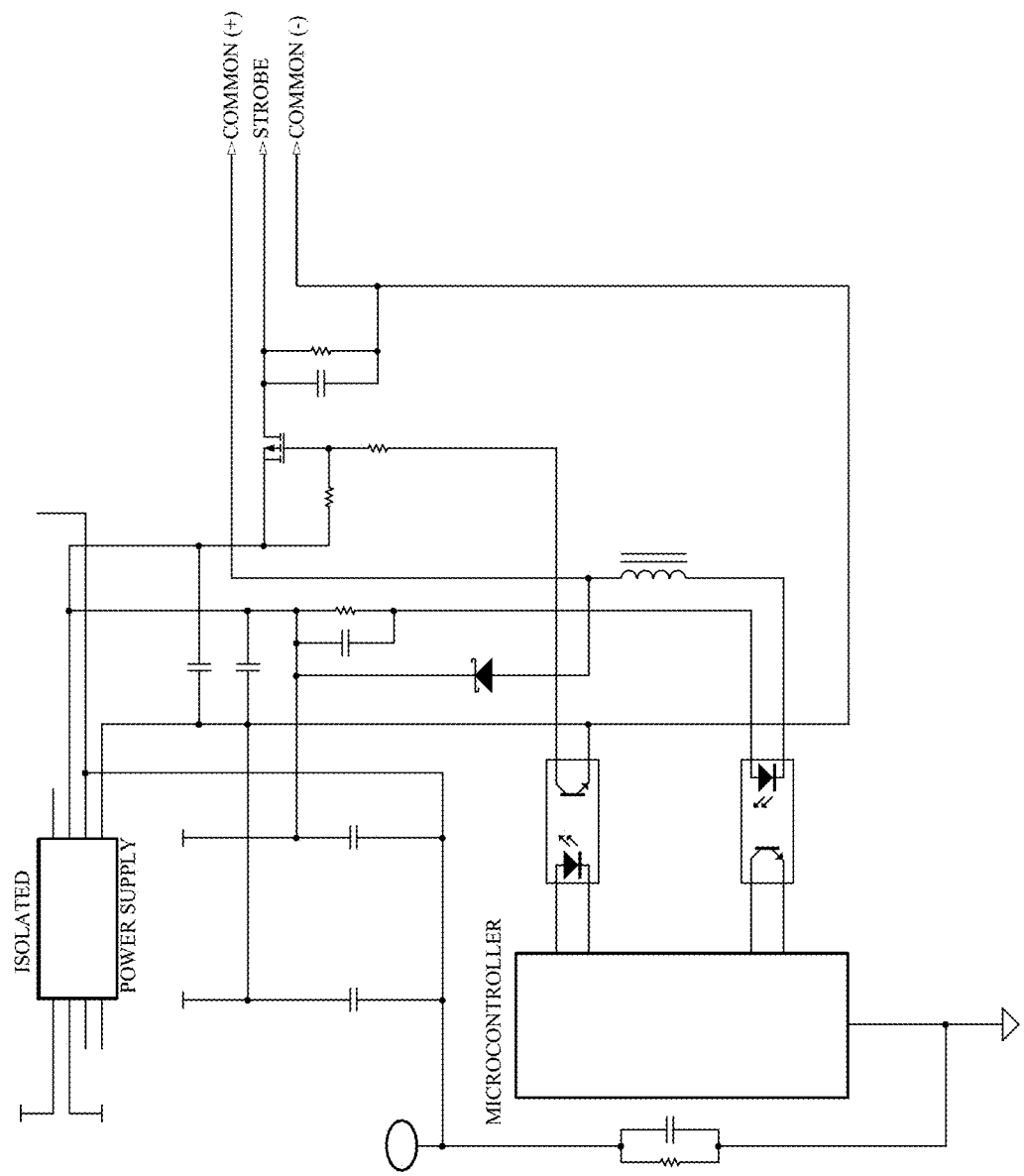
FIG. 26 is a schematic illustrating an exemplary interface circuit in accordance with some implementations of the present invention.

FIGS. 25 and 26 are conceptual schematics illustrating an exemplary transducer circuit and an exemplary interface circuit, respectively, in accordance with embodiments of the present invention, where the components and functionality illustrated therein are described in detail heretofore. It is to be appreciated that these illustrations are not meant to provide all details of a functional system, but rather, are intended to provide a generalized overview of a system in accordance with some embodiments of the present invention. As illustrated in the exemplary transducer circuit of FIG. 25, and with reference to the discussion heretofore, in response to a strobe signal on a strobe line of a multi-conductor cable, a first tuned, high impulse, cycle-limited current pulse may be generated. Thereafter, and at a time difference determined with reference to an electrical characteristic of an analog sensor, a second tuned, high impulse, cycle-limited current pulse may be generated.

As illustrated in the exemplary interface circuit of FIG. 26, a strobe stage and acquisition stage may be isolated from a microcontroller. The strobe stage can include a strobe driver having a field-effect transistor and a filter for providing an isolated strobe signal on a multi-conductor cable to one or more transducers. The acquisition stage, significantly consisting of LCR components, may receive an indication of current changes in the isolated power supply loop of common (+) line and the common (−) line of the multi-conductor cable.

It is to be understood that variations, modifications, and permutations of embodiments of the present invention may be made without departing from the scope thereof. It is also to be understood that the present invention is not limited by the specific embodiments, descriptions, or illustrations or combinations of either components or steps disclosed herein. Thus, although reference has been made to the accompanying figures, it is to be appreciated that these figures are exemplary and are not meant to limit the scope of the invention.

Moreover in this document, relational terms, such as second, top and bottom, and the like may be used solely to distinguish one entity or action from another entity or action without necessarily requiring or implying any actual such relationship or order between such entities or actions. The terms "comprises", "comprising", "has", "having," "includes", "including", "contains", "containing", or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional elements of the same type in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A system for monitoring at least two analog sensors, said system comprising:
   a) a multi-conductor cable comprising a differential power line and a strobe line, said differential power line having a positive line and a negative line;
   b) a first transducer coupled with said cable and a first sensor;
   c) a second transducer coupled with said cable and a second sensor; and
   d) an interface coupled with said cable, an isolated power supply, and a microcontroller, said interface comprising:
      (i) a strobe stage to provide a strobe signal on said strobe line to cause said first transducer to provide a report signal corresponding to said first sensor and said second transducer to provide a report signal corresponding to said second sensor; and
      (ii) an acquisition stage to receive said first transducer report signal and said second transducer report signal on said differential power line.

2. The system of claim 1, wherein said first transducer report signal comprises a pair of cycle limited current pulses through said differential power line.

3. The system of claim 2, wherein said first transducer causes said first of said pair of current pulses of said first transducer report signal to commence at a first time relative to said strobe signal.

4. The system of claim 3, wherein said first transducer causes said second of said pair of current pulses of said first transducer report signal to commence at a second time, wherein a difference between said first time and said second time corresponds to a characteristic of said first sensor.

5. The system of claim 4, wherein said second transducer report signal comprises a pair of current pulses through said differential power line, wherein said second transducer causes said first of said pair of current pulses of said second transducer report signal to commence at a third time relative to said strobe signal, and wherein said second transducer causes said second of said pair of current pulses of said second transducer report signal to commence at a fourth time relative to said strobe signal, wherein a difference between said third time and said fourth time corresponding to a characteristic of said second sensor.

6. The system of claim 1, each said transducer comprising a first and a second latching bistable switch for providing conduction between said positive and said negative lines of said differential power line for a limited duration.

7. The system of claim 6, wherein each said bistable switch comprises a thyristor.

8. The system of claim 6, each said transducer further comprising (i) a transducer identifier trigger coupled with said first switch and (ii) a sensor value trigger coupled with said second switch.

9. The system of claim 8, wherein said sensor value trigger of said first transducer is further coupled with said first sensor and said sensor value trigger of said second transducer is further coupled with said second sensor.

10. A system for monitoring an analog sensor comprising:
   a) a transducer comprising a transducer identifier trigger, a sensor value trigger coupled with said sensor, a first thyristor coupled with said transducer identifier trigger, and a second thyristor coupled with said sensor value trigger; and
   b) an interface coupled with an isolated power supply and with a microcontroller, said interface comprising a strobe stage and an acquisition stage,
   wherein said strobe stage comprises a driver circuit, said driver circuit comprising an opto-isolator having (i) a light emitter coupled with said microcontroller and (ii) a light sensor coupled with a gate of a field-effect transistor, said field-effect transistor further having a drain coupled with said transducer providing a strobe signal thereto, and
   wherein said acquisition stage comprises an opto-isolator having (i) a light sensor coupled with said microcontroller and (ii) a light emitter coupled between a positive line of said isolated power supply and a first side of an inductor, said inductor having a second side coupled to said transducer receiving a report signal therefrom;
   wherein said transducer is configured to, in response to said strobe signal, provide said report signal by providing conduction between said second side of said inductor and a negative line of said isolated power supply for a limited duration.

11. The system of claim 10, wherein said report signal comprises a first and a second cycle limited current pulse, wherein said transducer is preconfigured to provide said first current pulse at a first time from said strobe signal, and wherein said transducer provides said second current pulse at a second time corresponding to a characteristic of said sensor.

* * * * *